(12) United States Patent
Schultz et al.

(10) Patent No.: US 9,602,163 B2
(45) Date of Patent: Mar. 21, 2017

(54) WIRELESS DEVICE DETECTION AND COMMUNICATION APPARATUS AND SYSTEM

(75) Inventors: John Colin Schultz, Mawson Lakes (AU); Christopher Richard Wood, Mawson Lakes (AU); Philip David Carrig, Mawson Lakes (AU); David Malcolm Hall, Mawson Lakes (AU)

(73) Assignee: XPED HOLDINGS PTY LTD, Mawson Lakes, South Australia (AU)

( * ) Notice: Subject to any disclaimer, the term of this patent is extended or adjusted under 35 U.S.C. 154(b) by 0 days.

(21) Appl. No.: 13/883,323

(22) PCT Filed: Nov. 3, 2011

(86) PCT No.: PCT/AU2011/001412
§ 371 (c)(1),
(2), (4) Date: May 3, 2013

(87) PCT Pub. No.: WO2012/058724
PCT Pub. Date: May 10, 2012

(65) Prior Publication Data
US 2013/0225077 A1    Aug. 29, 2013

(30) Foreign Application Priority Data
Nov. 3, 2010    (AU) ................................ 2010904897

(51) Int. Cl.
*H04B 7/00*    (2006.01)
*H04B 5/00*    (2006.01)
*H02J 7/02*    (2016.01)
*H02J 7/00*    (2006.01)

(52) U.S. Cl.
CPC ............ *H04B 5/0025* (2013.01); *H02J 7/025* (2013.01); *H04B 5/0037* (2013.01); *H04B 5/0081* (2013.01); *H02J 7/0027* (2013.01)

(58) Field of Classification Search
CPC ... G06K 19/0723; G06K 7/10237; H04B 5/00
USPC ...... 455/41.1, 41.2, 41.3, 39, 500; 340/10.1, 340/854.8
See application file for complete search history.

(56) References Cited

U.S. PATENT DOCUMENTS

| | | | |
|---|---|---|---|
| 8,340,577 B2* | 12/2012 | Griffin et al. | 455/41.2 |
| 8,422,946 B2* | 4/2013 | Bangs et al. | 455/41.1 |
| 8,867,990 B2* | 10/2014 | Royston et al. | 455/41.1 |
| 2010/0039066 A1 | 2/2010 | Yuan et al. | |
| 2015/0044966 A1* | 2/2015 | Shultz et al. | 455/41.1 |

FOREIGN PATENT DOCUMENTS

WO    WO 2009/033043 A2    3/2009

OTHER PUBLICATIONS

Inanlou et al., "A Novel Pulse-Based Modulation Technique for Wideband Low Power Communication with Neuroprosthetic Devices", NIH Public Access, Aug. 9, 2011.

* cited by examiner

*Primary Examiner* — Sonny Trinh
(74) *Attorney, Agent, or Firm* — Sand & Sebolt

(57) ABSTRACT

A method for effecting a near field communication, including the steps of positioning a first device at a close proximity to a second device, wherein the close proximity is suitable for the near field communication; and sending a first effectively carrierless signal from the first device to the second device.

16 Claims, 18 Drawing Sheets

WIRELESS DEVICE DETECTION AND COMMUNICATION APPARATUS AND SYSTEM

This application is the national stage of International Application PCT/AU2011/001412, filed in Australia on Nov. 3, 2011, which in turn claims priority under 35 USC 119(a)-(d) of Australian Application 2010904897, filed in Australia on Nov. 3, 2010.

FIELD OF INVENTION

The present invention relates to near field communication between devices in a close proximity.

INCORPORATION BY REFERENCE

This patent application claims priority from:
Australian Provisional Patent Application No. 2010904897 titled "Wireless Device Detection Apparatus and System" filed 3 Nov. 2010.
The entire content of this application is hereby incorporated by reference.

BACKGROUND OF THE INVENTION

With the advent of close proximity near field communication systems which use the magnetic near field for communication (of which the Near Field Communication (NFC) standard is one such standard), a variety of new applications have emerged that can benefit from this close proximity near field communication systems.

Some close proximity near field communication systems can provide high data rates over a wireless communication channel within a range of several centimeters and enables a user to exchange data between devices by simply performing a sweep, wave or touch gesture of one device in close proximity to another like device or device appropriately enabled.

The high data rates are driven by the need to transfer ever increasing amounts of data over the very short period of time available while the two devices are within close proximity. If the data transfer takes too long, the user experience will be affected as the user will be required to maintain the two devices in close proximity for an extended or an indeterminate period of time.

One of the devices is typically a mobile device such as a mobile phone, and the second device is typically a fixed device—such as a Point of Sale (POS) terminal or powered electronic sign.

In the arrangement described above, the fixed terminal device is typically mains powered and as such has substantially no power consumption constraints. It is considered a master in the system and as a result produces broadcast near field transmissions in the form of a modulated carrier, such that a slave mobile device can detect these signals, wake up from a low-power sleep state and begin communication with the master device. The full data transmission must occur while the communication mechanisms are within communication range.

There are cases where it is beneficial to utilize near field communication between a mobile device and another mobile device. Since the minimization of power consumption is a primary driver in the design of mobile devices, or any battery-powered device, it is currently not practical to have a battery-powered device act as a master as its requirement to continuously broadcast a beacon signal which includes a carrier would place an unacceptable drain on the battery.

To implement the mobile to mobile communication case it is common to initiate and assign a master role to one of the devices by having the user select a menu item, icon, initiate an application, or the like, thus initiating the broadcast near field transmission. Once the near field data transaction (data exchange) has occurred or the system has timed out, the master mode would be exited and the devices would typically resume sleep mode and act as slaves again.

A typical arrangement of a near field system includes two devices as described above. In arrangements that contain many devices, in particular where many devices can communicate with many other devices which may be of varying or unknown types, it becomes impractical to assign one or more of those devices to be masters, especially if the assignment needs to be activated manually.

There are many NFC protocols in common usage and most NFC chips support several of these, for example Felica, Mifare and NFCIP-1 etc. Thus compatibility between master and slave becomes an issue. For example if the master is set to the Mifare protocol and the slave is set to the NFCIP-1 protocol, the devices may not be able to communicate.

BRIEF SUMMARY OF THE INVENTION

According to a first aspect of the present invention, there is provided a method for effecting a near field communication, including the steps of positioning a first device at a close proximity to a second device, wherein the close proximity is suitable for the near field communication; and sending a first effectively carrierless signal from the first device to the second device.

In one embodiment, the first effectively carrierless signal includes a pulse. In one embodiment, the first effectively carrierless signal includes a series of pulses. In one embodiment, the first effectively carrierless signal includes a temporal oscillating signal. In one embodiment, the step of sending the first effectively carrierless signal causes the step of sending a second effectively carrierless signal from the second device device. In one embodiment, the step of sending the second effectively carrierless signal causes the step of establishing a wireless link for data transfer between any two of the first device, the second device and a third device.

In one embodiment, the second device is a device compliant with a first NFC protocol, and the sending the first effectively carrierless signal allows the second device to communicate with the first device using the first NFC protocol.

According to a second aspect of the present invention, there is provided a method for effecting a near field communication, including the steps of positioning a first device at a close proximity to a second device, wherein the close proximity is suitable for the near field communication; and sending a first carrierless signal from the first device to the second device.

According to a third aspect of the present invention, there is provided a method for charging a first device, including the steps of positioning the first device at a close proximity to a second device, wherein the close proximity is suitable for a near field communication, and said positioning allows the first device to send a first signal from the first device to the second device; sending a second signal from the second device to the first device upon receiving the first signal; and charging wirelessly a power storage medium of the first device using a charging mechanism of the second device.

In one embodiment, the step of sending the second signal from the second device to the first device includes requesting a confirmation signal to confirm a presence of the first device in the close proximity. In one embodiment, the method of the third aspect further includes the step of pausing, for a pausing period, the charging mechanism when the confirmation signal is not received after a waiting period.

In one embodiment, the method of the third aspect further includes the step of sending a device status of the first device from the second device to a third device. In one embodiment, the device status includes the charging status of the first device.

According to a fourth aspect of the present invention, there is provided a method for charging a first device, including the steps of positioning the first device at a close proximity to a second device, wherein the close proximity is suitable for a near field communication, and said positioning causes the first device to send a first signal from the first device to the second device; and charging wirelessly a power storage medium of the first device using a charging mechanism of the second device.

According to a fifth aspect of the present invention, there is provided a device, including a transmitting element for sending a first effectively carrierless signal to a second device when the device is positioned at a close proximity to the second device, wherein the close proximity is suitable for a near field communication.

In one embodiment, the device of the fifth aspect further includes an accelerometer for detecting a movement of the device for preventing the device from sending the first carrierless signal when the movement of the device is less than a predetermined threshold. In one embodiment, the device of the fifth aspect further includes a first receiving element for receiving a second effectively carrierless signal from the second device. In one embodiment, the first effectively carrierless signal and the second effectively carrierless signal establish a wireless link for data transfer between any two of the first device, the second device and a third device.

In one embodiment, the second device is a device compliant with a first NFC protocol, and the sending the first effectively carrierless signal allows the second device to communicate with the first device using the first NFC protocol.

In one embodiment, the device of the fifth aspect further includes a rechargeable power storage medium for supplying power to the device; a second receiving element for receiving a charging field from the second device; and a circuit for using the charging field to charge the rechargeable power storage medium. In one embodiment, in the presence of the charging field, the device load modulates the charging field at a regular predetermined interval.

In one embodiment, the device of the fifth aspect further includes a communication mechanism having a first communicating element compliant to a first NFC protocol; wherein the transmitting element and the first communicating element are the same element.

According to a sixth aspect of the present invention, there is provided a device including a receiving element for receiving a receive signal from a second device, the receive signal including a first signal; a circuit for detecting the first signal, the first signal indicating a presence of the second device at a close proximity to the device, wherein the close proximity is suitable for a near field communication; a charging mechanism for generating a charging field for charging wirelessly a rechargeable power storage medium of the second device; and a transmitting element for sending a second signal to the second device requesting a confirmation signal to confirm the presence of the second device in the close proximity.

In one embodiment, the charging mechanism pauses, for a pausing period, when the confirmation signal is not received after a waiting period. In one embodiment, the device of the sixth aspect further includes a circuit for modulating the charging field for communicating with the second device. In one embodiment, the circuit modulates the charging field with a pulse.

In one embodiment, the device of the sixth aspect further includes a communication mechanism to communicate with a third device for sending a signal from the second device to the third device.

In one embodiment, the charging mechanism is adapted to charge concurrently more than one device with a rechargeable power storage medium using a single carrier. In one embodiment, the charging mechanism includes a single coil adapted to charge concurrently more than one device with a rechargeable power storage medium using a single carrier.

Throughout this specification and the claims that follow unless the context requires otherwise, the words 'comprise' and 'include' and variations such as 'comprising' and 'including' will be understood to imply the inclusion of a stated integer or group of integers but not the exclusion of any other integer or group of integers.

The reference to any background or prior art in this specification is not, and should not be taken as, an acknowledgment or any form of suggestion that such background or prior art forms part of the common general knowledge.

"Logic," as used herein, includes but is not limited to hardware, firmware, software, and/or combinations of each to perform a function(s) or an action(s), and/or to cause a function or action from another component. For example, based on a desired application or needs, logic may include a software controlled microprocessor, discrete logic such as an application specific integrated circuit (ASIC), or other programs are logic device. Logic may also be fully embodied as software.

"Software," as used herein, includes but is not limited to one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skilled in the art that the form of software is dependent on, for example, requirements of a desired application, the environment it runs on, and/or the desires of a designer/programmer or the like.

Those of skill in the art would understand that information and signals may be represented using any of a variety of technologies and techniques. For example, data, instructions, commands, information, signals, bits, symbols, and chips may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in the embodiments disclosed herein may be implemented directly in hardware, in a software module executed by a processor, or by using a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or other electronic units or combinations thereof designed to perform the functions described herein. Software modules, also known as computer programs, computer codes, or instructions, may contain a number of source code or object code segments or instructions, and may reside in a computer readable medium such as a RAM memory, flash memory, ROM memory, EPROM memory, registers, hard disk, a removable disk, a CD-ROM, a DVD-ROM, or any other form of computer readable medium. Alternatively, the computer readable medium may be integral to the processor. The processor and the computer readable medium may reside in an ASIC or related device. The software codes may be stored in a memory unit and executed by a processor. The memory unit may be implemented within the processor, or external to the processor in which case it would be communicatively coupled to the processor via various means as is known in the art.

Specific embodiments of the invention will now be described in further detail with reference to and as illustrated in the accompanying figures. These embodiments are illustrative, and not meant to be restrictive of the scope of the invention. Suggestions and descriptions of other embodiments may be included within the scope of the invention but they may not be illustrated in the accompanying figures or alternative features of the invention may be shown in the figures but not described in the specification.

DETAILED DESCRIPTION OF EMBODIMENTS OF THE INVENTION

Figure 1A:
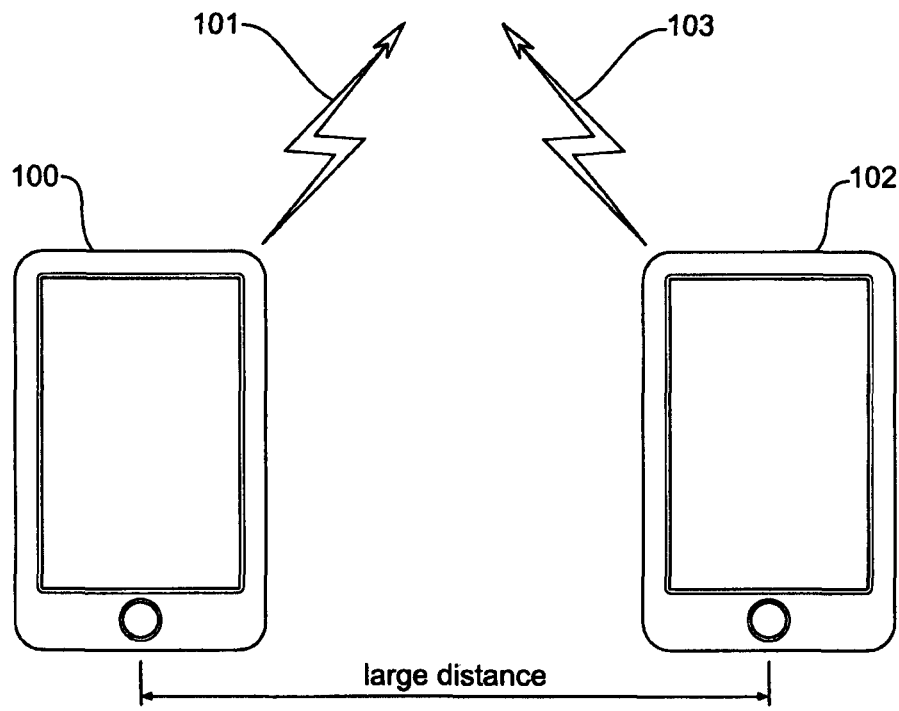
FIG. 1A illustrates two mobile devices broadcasting Pulse Pings when each device is out of range of Pulse Pings.

The present invention relates to systems, apparatuses, and methods that allow two or more devices at a close proximity to communicate between each other using near field (electromagnetic, predominantly magnetic, or predominantly electric).

In one embodiment, electronic circuits have been designed to enable wireless transmissions through a transmitter element using carrierless signals without using carrier modulation techniques. Examples of a carrierless signal include, but not limited, to a Ping (or pulse) and a series of Pings (or pulses).

A carrierless signal can be effected by carrier generating circuits by turning on the carrier for several cycles then turning off the carrier. Using a low duty cycle for the carrier on time to the carrier off time results in a temporal transmission of the carrier (a carrier burst system) that can have much lower average power consumption compared to a continuous carrier transmission. For example, it is possible to transmit a short duration (say 5 µs) of an oscillating signal every 100 ms to represent a Ping. Accordingly, one embodiment of the present invention is about using an effectively carrierless signal for a near field communication between two devices at a close proximity. A very specific form of OOK, where the duty cycle is less than 50%, is an effectively carrierless signal too, for example, when an oscillating signal is turned on for a short duration to represent a pulse.

This is different for existing communication systems where a modulation of a carrier signal (carrier-based system) is employed to achieve high data rates, for example, by establishing a radio frequency (RF) carrier signal that is modulated by the baseband data. Systems that use this principle include NFC, RFID, PAN, and LAN systems, and may use AM, FM, PM, OOK, FSK, or PSK modulation techniques. This embodiment of the present invention is all about sending a short duration signal over a close proximity through near field communication. This fundamental difference leads to lower average power consumption as energy is not required to set up and maintain a carrier signal. The result is a means of detecting or communicating with a device within the close proximity near field but at a much reduced average power.

In the case of systems that already use a carrier for wireless charging, and in accordance to another embodiment of the present invention, the existing carrier is utilized to transfer data from the charger to the chargeable device. In this case also, only very small amounts of extra energy are needed to communicate the data.

Various types of communication signal have been developed to enable data transmission to occur in various use cases and across different device types.

To facilitate the discussion of various embodiments of the present invention, the following definition is followed:

- Carrierless signal: a signal generated by electronic circuits to enable wireless transmissions through a transmitter element without using carrier modulation techniques. It is also known as baseband signal.
- Effectively carrierless signal: a superset of carrier signal and includes broadly signals which can perform the function of a carrierless signal. For example, a very specific form of OOK where the duty cycle is lesser than 50% would be an effectively carrierless signal.
- Ping: a signal.
- Pulse Ping: a carrierless or effectively carrierless signal used for data communications between devices that are not being wirelessly charged.
- Carrier Modulation Ping or CM Ping: (in the context of a charger) a signal created by modulating a wireless charging carrier to communicate from a wireless charger to a device being charged.
- Load Ping: (in the context of a device being charged) a signal created by load modulating a wireless charging carrier from a charger to communicate with a wireless charger while being charged.
- Transmitting/receiving element: a part suitable for transmitting/receiving an electromagnetic field, including a predominantly magnetic field, or a predominantly electric field. Examples include, but not limited to, a coil, a dipole, a monopole, a multi-turn coil, an etched printed circuit board, a wire, a capacitive plate, inductor.
- Communication: broadly representing the act of, or a process including, sending a signal from a transmitting element to a receiving element. It includes a one-way communication, two-way communication.

Pulse Pings can be transmitted to a device, whether powered from battery or some other form of power supply. However, if the device is being wirelessly charged, then CM Pings and Load Pings are used.

A Ping is the ringing event of the magnetic field of a coil which is connected in a network with a series or parallel capacitor, caused by momentarily energizing the coil with a short duration current pulse. As the coil current is removed, the stored magnetic field collapses which develops a large voltage across the coil which charges the capacitor, and when the capacitor is charged current is delivered to the coil in the opposite direction and this continues until the energy is dissipated in losses. Repeated changes in direction of the coil current create an oscillating magnetic field which may induce voltages in other coils in close proximity.

Additionally a Ping can be generated by applying a short duration voltage pulse to an antenna element which causes a predominantly electric field to be transmitted, which can be received be a receiving element or antenna.

If the duration of the pulse of a Ping is sufficiently short in time compared to the time between successive pulses, then the energy consumed in the system is extremely low. For example, a current of 1A having a duration of 1 µs repeated at 10 Hz can yield an average transmitter current of 10 µA. This represents little more than the leakage current for many batteries and as such has little effect on the battery capacity of a mobile or other battery-powered device, despite the circuit transmitting Ping continuously.

Additionally a data stream can be represented as a series of Pulse Pings. This data stream can be used to contain addresses or other identifiers, status, commands or other data. For example in an NFC system, a 1 µs Pulse Ping would consist of approximately 14 carrier cycles.

In one embodiment of the present invention, lower data rates are used compared to carrier-based systems as the transmitting coils, antennas, or elements are energized only momentarily by a pulse or Ping signal, requiring sufficient time for both the transmit and receive coils to cease ringing once the pulse has been removed. This ringing decay time is one limiting factor that determines system data exchange throughput. The ringing decay time of the coil can be controlled by dampening the coil with a series resistor and capacitor network, often referred to as a snubber circuit. The extent to which this can reduce the ringing time may be dependent on how much damping can be applied to a coil which has to transmit and receive Pings and at other times may be required to collect energy as efficiently as possible for battery charging. Dampening may be switched in and out of such a multi-functioned coil. A second limiting factor of the data rate is the impulse response of the amplifiers within the receiver. The settling time of a low-power amplifier used for a battery-powered device may be many times longer than the duration of the Pulse Ping.

A data transmission and/or receiving element can include a coil, track, antenna, etc where such elements can be separate or one and same element. A battery could be replaced or used in conjunction with a super-capacitor, a bulk capacitor or other power storage medium deemed appropriate by a person skilled in the art.

In systems where only low data-rates are required, the data transfer may be communicated using the proximity communication mechanism embodiment described herein. However when large data transfers can not be accommodated in an appropriate time by using the proximity communication mechanism, additional wireless communication mechanisms can be utilized in the system. An additional communication mechanism could be a high speed proximity communications mechanism, such as the carrier based NFC system.

Alternatively, these additional mechanisms can support long range and high data-rate transmissions which can be used to transmit large amounts of data over distances beyond the few centimeters of the proximity communication method, and may be used once an initial proximity data exchange has taken place.

This may include in one embodiment an arrangement where, through using proximity communication as described, some initial data, such as MAC addresses, PAD ID's, SSID's, security keys, or data channel, may be communicated between devices to be used to establish a further link between the two devices using an additional wireless mechanism. The advantages of exchanging this initial data over the proximity communication channel is that transmissions have such a low power level that it is difficult to detect over distances of more than a few centimeters, thus increasing the security of the system by making it less susceptible to a third party eavesdropper using a receiving device.

An advantage where the low power close proximity communication can be used to establish a long range wireless communications link is where a charger can notify other devices of the status of devices being charged. For example, if a charger has established a long range communications link with a display device such as a remote control, or controller, then the charger can send notifications, to that controller. This would be useful as once a user has placed a device onto the charger, the charge mat could send notifications to the controller regarding the status of the device being charged. This provides the benefit that a user does not need to physically go to the charger to check the status of the device as in fact the charger would send a notification to the controller that the battery has been fully charged.

Additionally if the charger is equipped with long range communications capability, it can use that communications mechanism to act as a range extender by receiving and packet forwarding data over the wireless communications mechanism. This reduces or removes the need to have additional hubs or range extenders in a wireless network environment as the charger itself can perform that role.

The long range wireless link can be established with a controller device when it is placed onto the charger. This can be achieved by using the close proximity communications mechanism to transfer the network and security parameters needed to set up the long range wireless link. Once established the charger can now have two way communications with the controller. In addition to the charger being able to send messages to the controller regarding charging status, it also provides for a convenient mechanism for a controller to communicate with a device that is itself not equipped with a long range wireless link. This is achieved by the controller sending the data to the charger which then forwards the data to the device using the close proximity communications mechanism while the device is placed on the charger, or visa versa. This can lead to a lower cost of manufacture of devices as a long range communications link is not required in the device itself. Indeed the cost of connectors is also eliminated as the data communications occurs over the wireless close proximity link. Significant user convenience is also provided to the users if large amounts of data need to be transferred or extended time periods are involved as part of the device operation. Placing the device on the charge mat provides the user the ability to conveniently set up parameters, view or download data or otherwise communicate with the device while only needing to hold the controller rather than both the controller and device in close proximity for the entire time.

In another embodiment, the low power proximity communication described can be used to detect the presence of another device within close range and wake up and initiate an alternative, higher data rate channel such as a higher speed proximity communications NFC system. This wake up can therefore be initiated automatically without user input other than the swipe gesture of the mobile device to the second device. Thus the current requirement of manually starting a NFC system by the user manually turning on a setting, starting an app, or the like, prior to the swipe or tap gesture has been eliminated. The user simply uses the gesture of the swipe to perform the required action carried out by the NFC. To the user, it appears as if the NFC is active continuously, where in fact it is only the very low power Ping system that is continuously active which performs the task of waking up and initializing the NFC system as required. The NFC can then power down again once the action has been complete.

These invention described is based on a low power Ping data transmission system that does not require a carrier to be separately established and energized to transfer data. However the invention also benefits a system that already uses a carrier, resulting in lower power solutions.

For example, a NFC system could generate short bursts of carrier of low duty cycle. This allows a receiver to detect a carrier burst to wake up another NFC system or a receiver to decode data resulting from a series of carrier bursts.

FIG. 1A illustrates a device 100 broadcasting a Pulse Ping 101 and a device 102 also broadcasting a Pulse Ping 103. Device 100 is located outside the reception range of Pulse Ping 103 and device 102 is located outside the reception range of Pulse Ping 101, such that neither devices are aware of the proximity of the other.

Figure 1B:
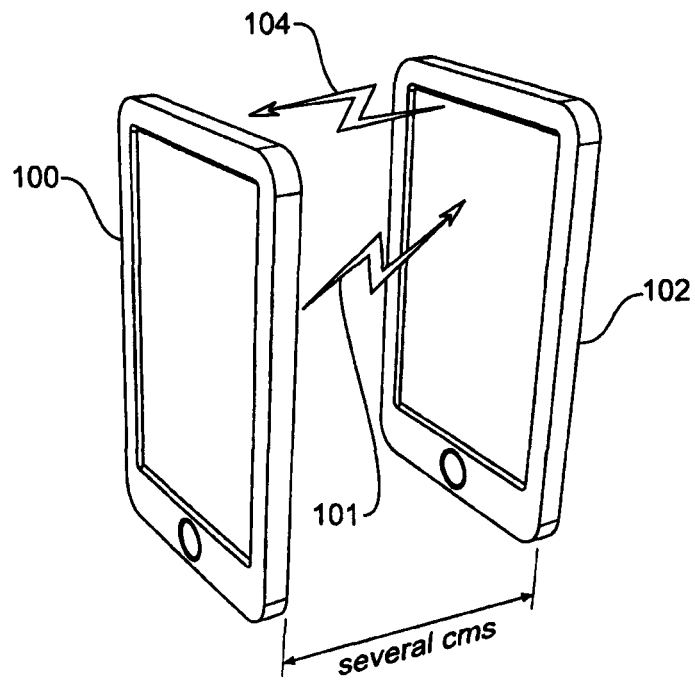
FIG. 1B illustrates two mobile devices being brought together when each is within range of the Pulse Pings.

FIG. 1B illustrates when the two devices 100 and 102 are brought close enough together such that each device is within the reception range of the broadcast Pulse Pings. In this case device 102 hears the Pulse Ping 101 from device 100, processes the data and responds with a Pulse Ping response 104 which device 100 receives. Device 100 and 102 are now aware of being within proximity of each other. Since the device broadcast Pulse Pings 101 and 103 are potentially and likely to be asynchronous, it is possible that they may be transmitted at the same time or at a time where part of the Ping data overlaps, thus corrupting the data.

Figure 2:
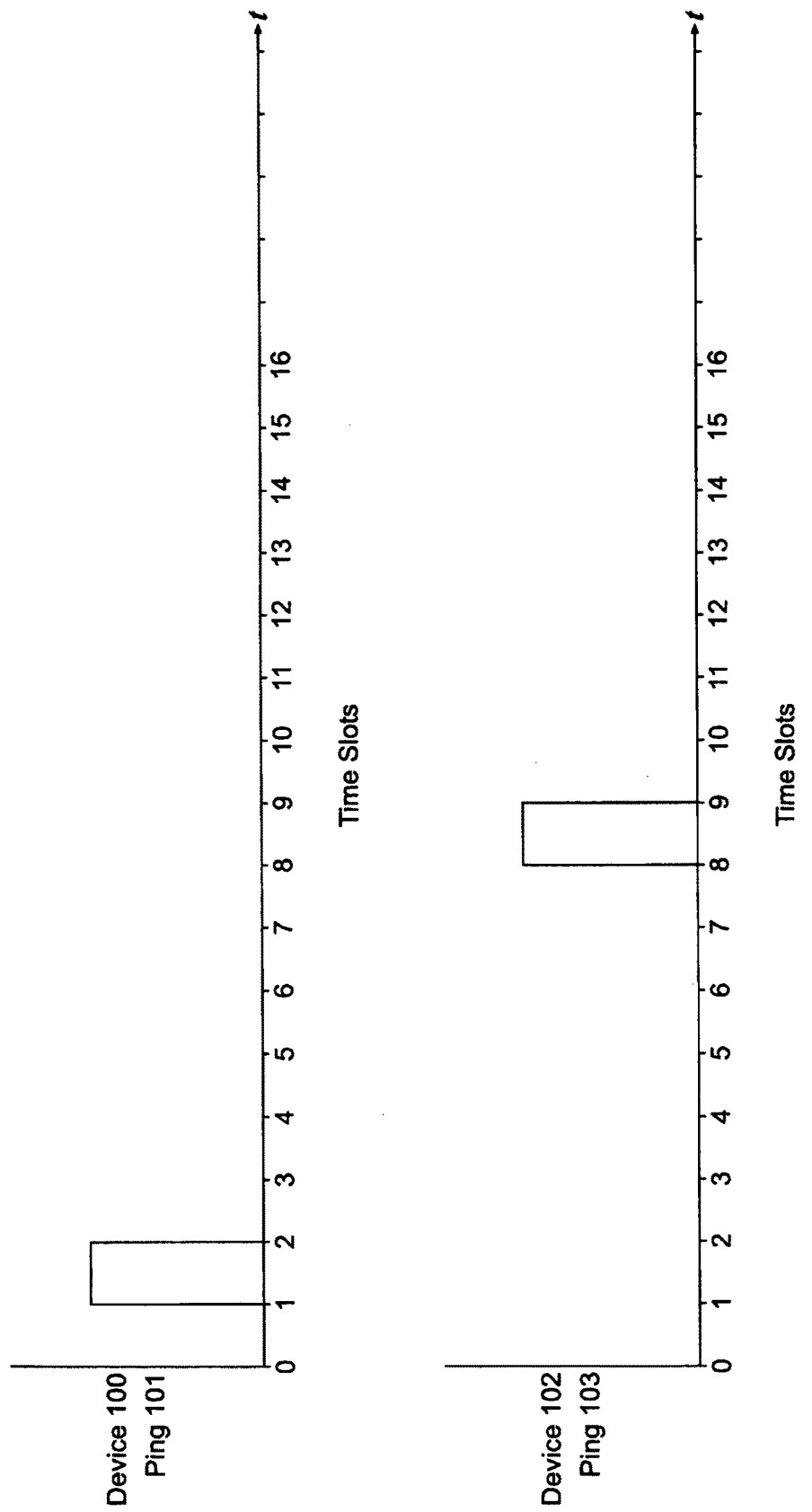
FIG. 2 illustrates the time multiplexing used for Pings.

FIG. 2 illustrates a method to minimize the potential of the Ping overlapping and being corrupted. By assigning Pings to be transmitted in discrete time slots, the probability of overlap decreases as the number of slots increases. Each device could use a random or pseudo random number to assign the Pulse Ping to a time slot prior to the transmission. This process is repeated for each Ping transmission, such that even with the now reduced probability of two Ping transmissions clashing, the probability of subsequent Ping transmissions clashing reduces even further with successive pulse transmissions. FIG. 2 shows an example of Pings being assigned to 16 possible time slots, where device 100 has selected slot 1 to transmit its Ping 101 and device 102 has selected slot 8 to transmit its Ping 103. Alternatively a random or pseudo random delay time can be used to vary the times between Pings to minimize Ping clashes.

Figure 3:
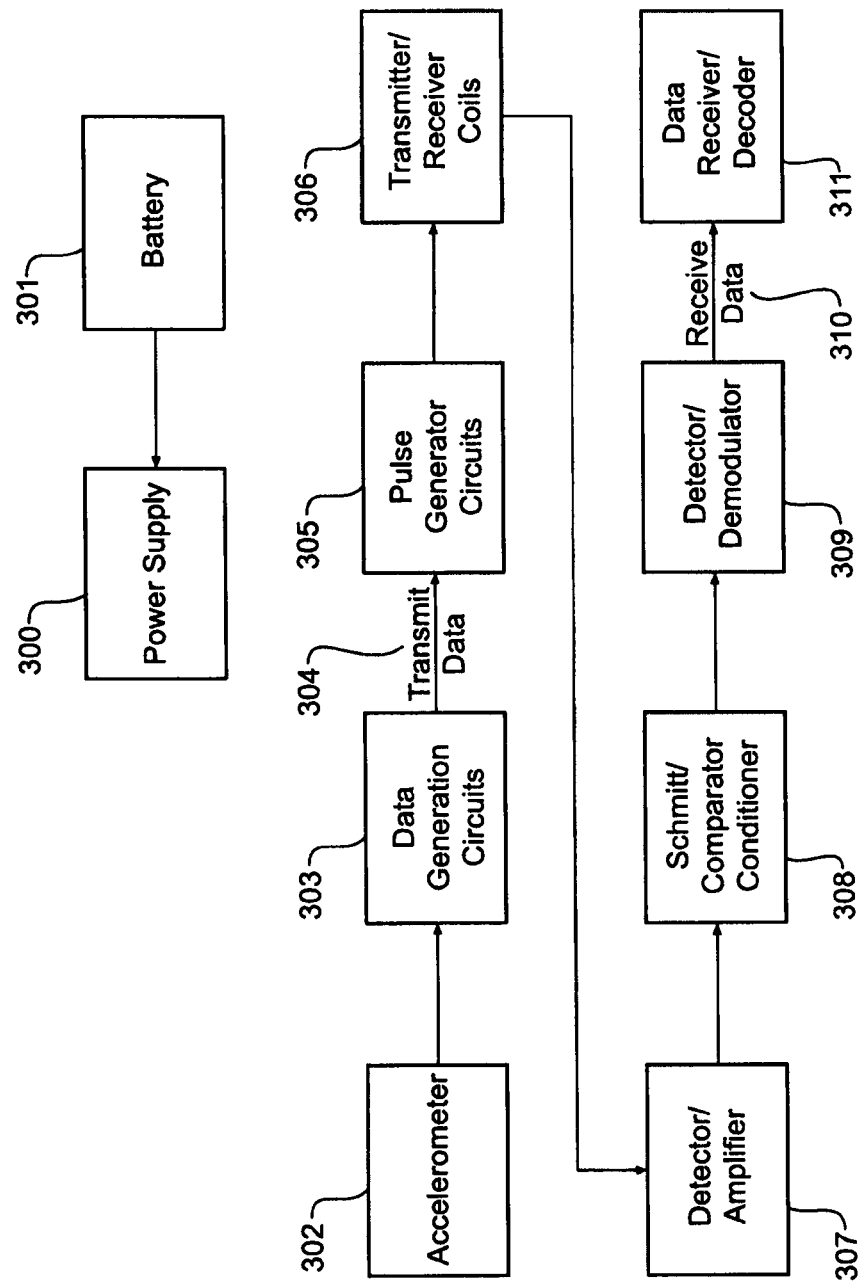
FIG. 3 illustrates the functional blocks of a device equipped with a close proximity communication arrangement for the transmission and reception of Pulse Pings, according to a first embodiment of the invention.

FIG. 3 shows the functional blocks of a device equipped with a close proximity communication arrangement that can transmit and receive Ping data. The device contains a power supply 300 to power the appropriate circuits. This may be optionally supplied by a battery 301.

The serial transmit data stream 304 is generated by the data generation circuits 303. The data 304 is used by the pulse generator circuit 305 to generate the Pings that are used to drive the transmitting element, in this case a coil 306. The data stream 304 can be generated by logic gate circuits or a microprocessor that may be powered by a battery or some other power source such as a DC or AC supply. The data stream represents the data that is required for the protocol selected for the device to device close proximity communication. In the lowest power configurations where a microprocessor is generating the data steam, the microprocessor would typically be powered off or asleep for the majority of the time.

To receive a Ping signal, it is necessary to have an arrangement that consists of a receiving element or coil 306, a detector/amplifier 307 and can also include an optional signal conditioning circuit such as a Schmitt trigger or comparator circuit 308. Further demodulating or decoding may be necessary depending on the protocols or modulation methods used for the data transmission.

Detector/Amplifier 307 is designed to add gain to the system so that the low amplitude Pings of the receive coil may be of sufficient amplitude to be squared to logic levels, if required, using a Schmitt trigger or comparator gate. The logic level pulses can then be used by additional logic stages or a microprocessor.

Since the energy of the Ping transmission is very low, the Ping receiver will typically only detect these events over a few centimeters which is a desirable feature of the close proximity communication arrangement of this invention.

For receiving Ping transmissions, detector amplifier 307 detects and if necessary amplifies the energy fluctuations on the coil 306. This signal is then fed into a conditioner 308 which may contain a Schmitt trigger circuit or a comparator circuit. An optional detector/demodulator 309 processes the signals further to produce the received data 310 then used by the data decoder/receiver 311. The serial data stream 310 can be received by logic gate circuits or a microprocessor that may be powered by a battery or some other power source such as a DC or AC supply. The data receiver 311 may in fact be the same microprocessor used for the data generation circuits 303. Even lower power operation can be achieved in using an optional accelerometer 302 to determine if the device is stationary (or the movement is below or less than a predetermined threshold) and completely power down the data stream generating circuits and the pulse generator circuits. The receiving circuits 307, 308, 309, and 311 can be continuously powered, partially powered down or a timed wake up method used to further reduce power. If a timed wake up method is used these circuits need to be woken up frequently enough not to miss any Pings or Ping preamble that might be used.

It is therefore possible for the mobile device to use even less power by not generating Pings when stationary (or the movement is below or less than a predetermined threshold). This does not compromise the ability for two devices to automatically detect each other, as for two devices to be brought into close proximity it is necessary for at least one of the devices to be moving, thus assuring Pings are being broadcast by that device. Since the stationary device still has its Ping detector circuits active or partially active, it can detect these Pings, waking up the data stream generator and pulse generator circuits enabling it to respond back with a Ping response 104 as shown on FIG. 1B.

It is advantageous to have a device that also has the ability to charge an on-board battery or other energy storage system/power storage medium using the wireless energy received by the system, which in a preferred embodiment uses the same antenna or coil used to transmit and receive the Ping data described above.

There are also an increasing number of devices emerging on the market that utilize wireless charging methods to charge and maintain batteries in mobile devices. It is therefore additionally beneficial if an arrangement can exist that combines the benefits of proximity communication with those of wireless charging.

Figure 4:
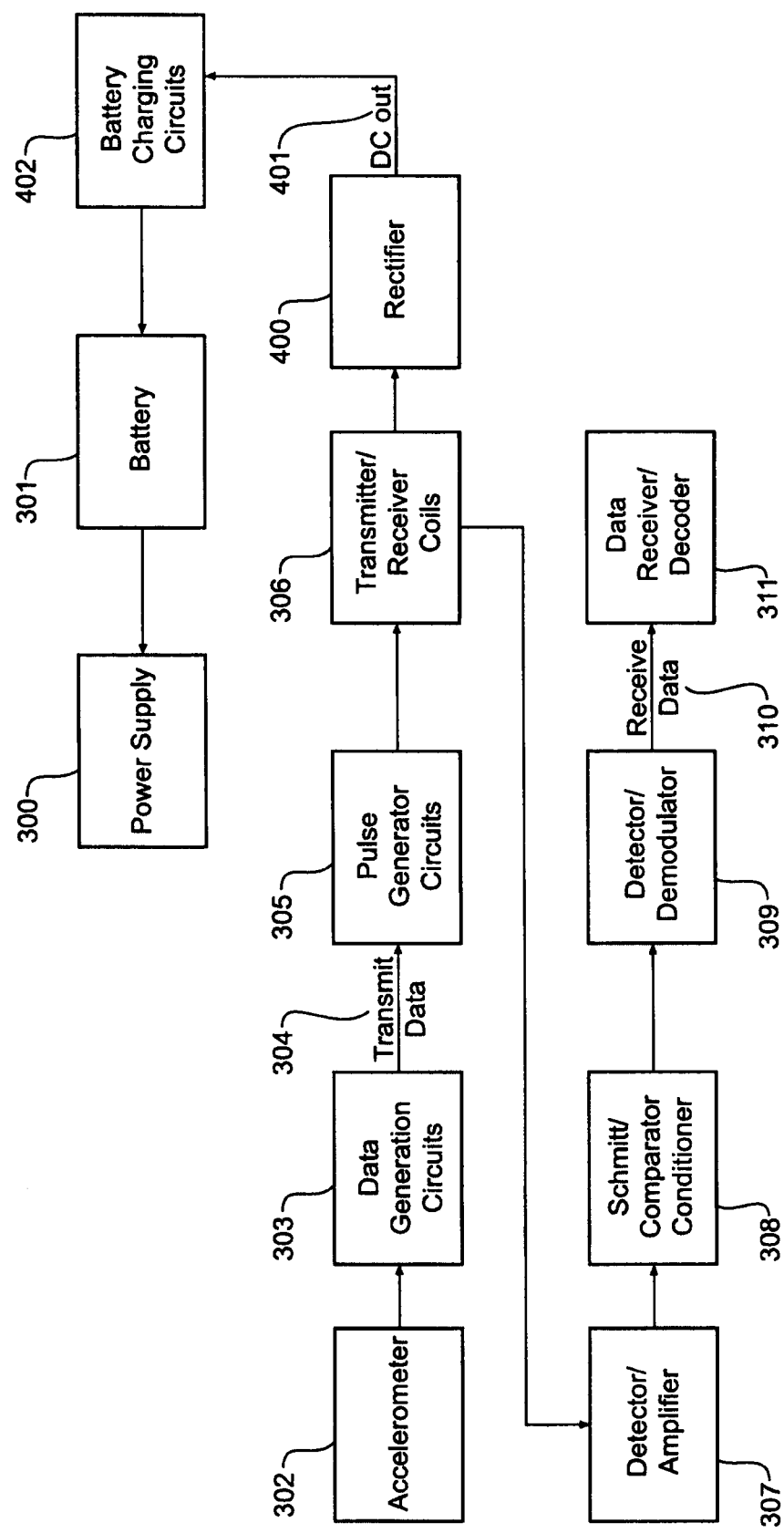
FIG. 4 illustrates the functional blocks of a device equipped with a wireless battery charging arrangement and a close proximity communication arrangement for the transmission of Load Pings and reception of Carrier Modulation (CM) Pings according to an second embodiment of the invention.

FIG. 4 shows a block diagram of an embodiment of a system that is used to achieve the above described functionality. When the device is not in close proximity range of a wireless charger, the elements shown in FIG. 4 operate identically to the elements shown in FIG. 3 as described previously. However, when a device as depicted in FIG. 4 is within close proximity range of a wireless charger, energy is received by the coil 306. This is then rectified by circuit 400 to produce a DC voltage 401 suitable for battery charging circuit 402 to charge the battery 301.

During charging, the power received by the coil 306 from the wireless charger is much greater than that which would be received by a Ping. Therefore amplifier 307 is less likely to be able to detect Pulse Pings while wirelessly charging. Therefore in order to facilitate data communications between devices during charging a different system needs to be employed.

Figure 5:
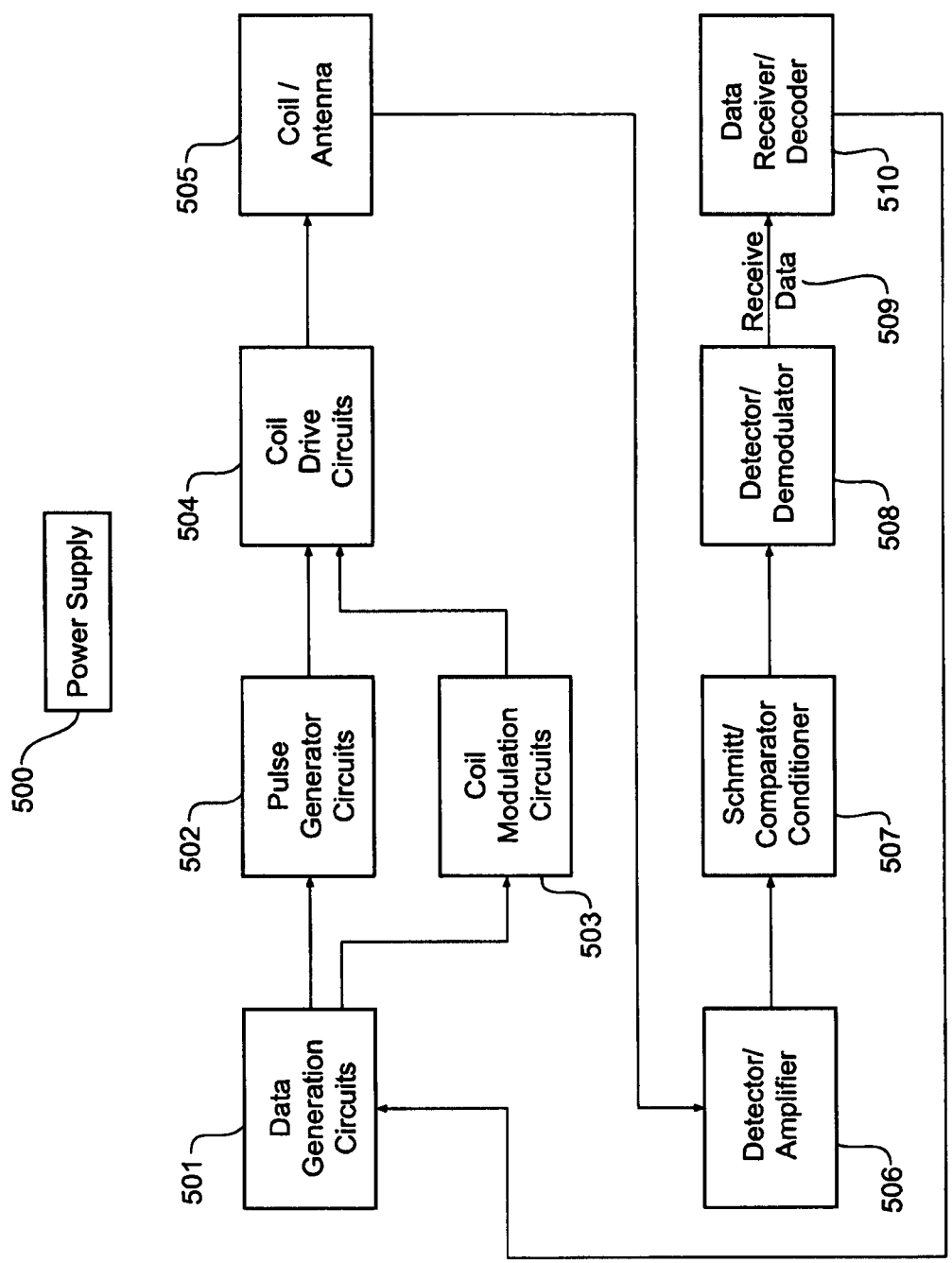
FIG. 5 illustrates a block diagram of the functional blocks of a wireless charger device equipped with a close proximity communications arrangement for the transmission of CM Pings and reception of Load Pings.

FIG. 5 illustrates the functional blocks of a wireless charger device in relation to communication during battery charging. This charger generates sufficient wireless energy to be received by a device as illustrated in FIG. 4 so that battery 301 can be charged. When charging is not required, the device operates and communicates identically to that described in FIGS. 3 and 4.

To charge a device, sufficient magnetic field from coil 505 is provided by driving the coil with a carrier signal using coil modulation circuits 503. The coil 306 in FIG. 4 is tuned for optimum electromagnetic power transfer at the selected carrier frequency or range of carrier frequencies used.

The principle used to transfer data from the charger to the device is to manipulate or modulate the existing carrier in such a way that an appropriately built receiver in the receiving device can be used to recover the data from the charger. The common methods used to achieve this are typically amplitude modulation (AM), frequency modulation (FM), phase reversal or frequency shift keying (FSK). This carrier modulated method is referred to generate a CM Ping.

Referring to FIG. 5, data can be communicated from a wireless charger to a device while charging by modulating the frequency or amplitude of the carrier generated by coil modulation circuits 503. The detected amplitude modulation (AM), frequency modulation (FM) or the frequency shifted carrier (FSK) then appears in the receiving device as received data out 310 as shown in FIG. 4.

This data 310 can then be used by a microprocessor directly, or by other suitable circuits to translate or demodulate the data. For example, a monostable may be used to create uniform pulses from received amplitude modulation, or a frequency to voltage converter may be used to detect the frequency changes of received frequency modulation and recover the original baseband data. When the charger is not charging devices, Ping data can be used to energize the coil drive circuits 504 to drive the coil 505 producing Pulse Pings.

Figure 6:
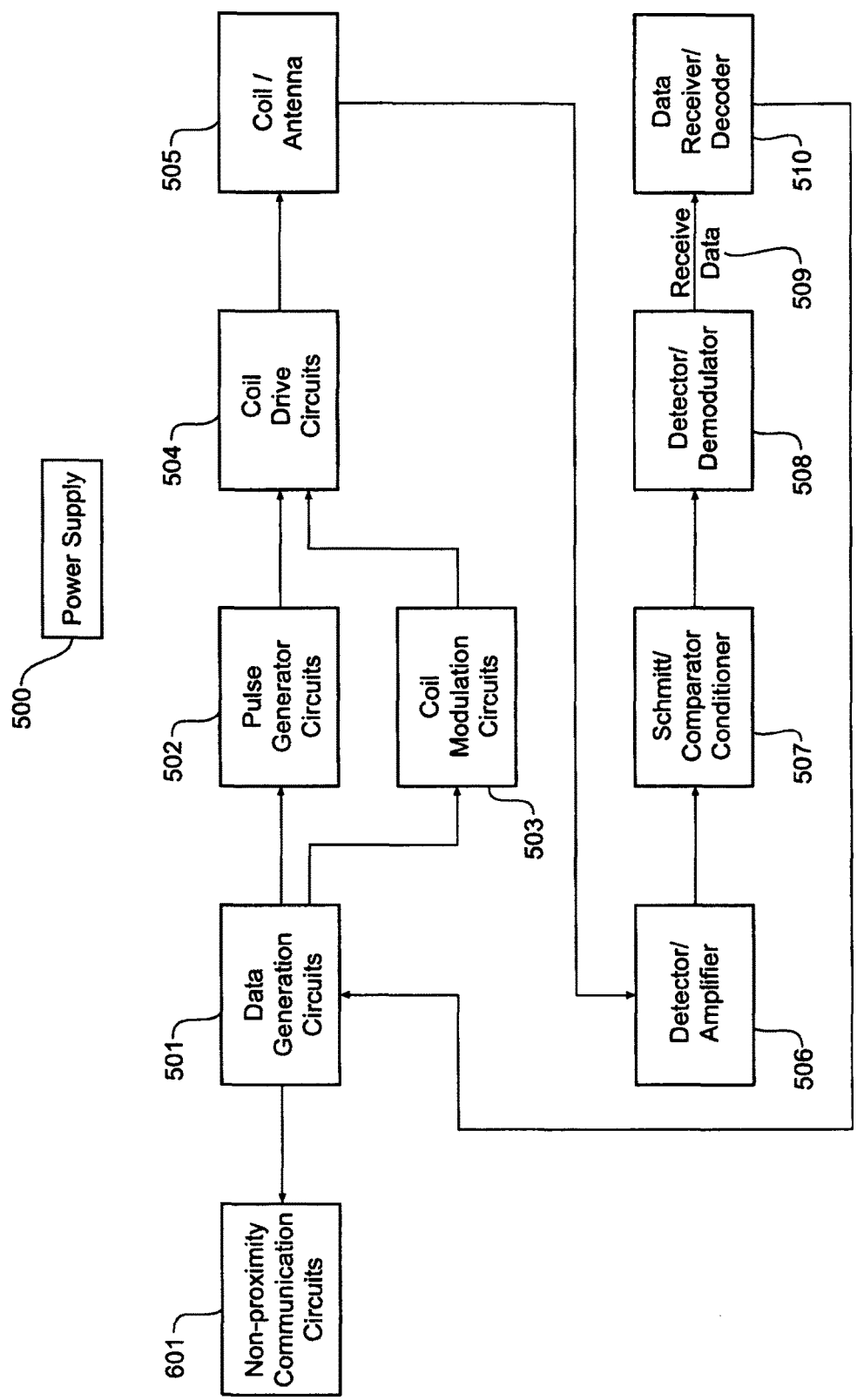
FIG. 6 illustrates a block diagram of the functional blocks of a wireless charger device equipped with a non-close proximity communications arrangement.

FIG. 6 depicts a charger equipped with a long range (non close proximity system) communications system to facilitate data transfer from the charger to a device using a long range wireless system. This shows the same operational block of FIG. 5 with the additional capability for the data generation circuits 501 connected to a non-proximity communication circuits 601, and data receiver/decoder circuits 510 to communicate data from the charger itself to devices and systems not within close proximity.

Figure 7:
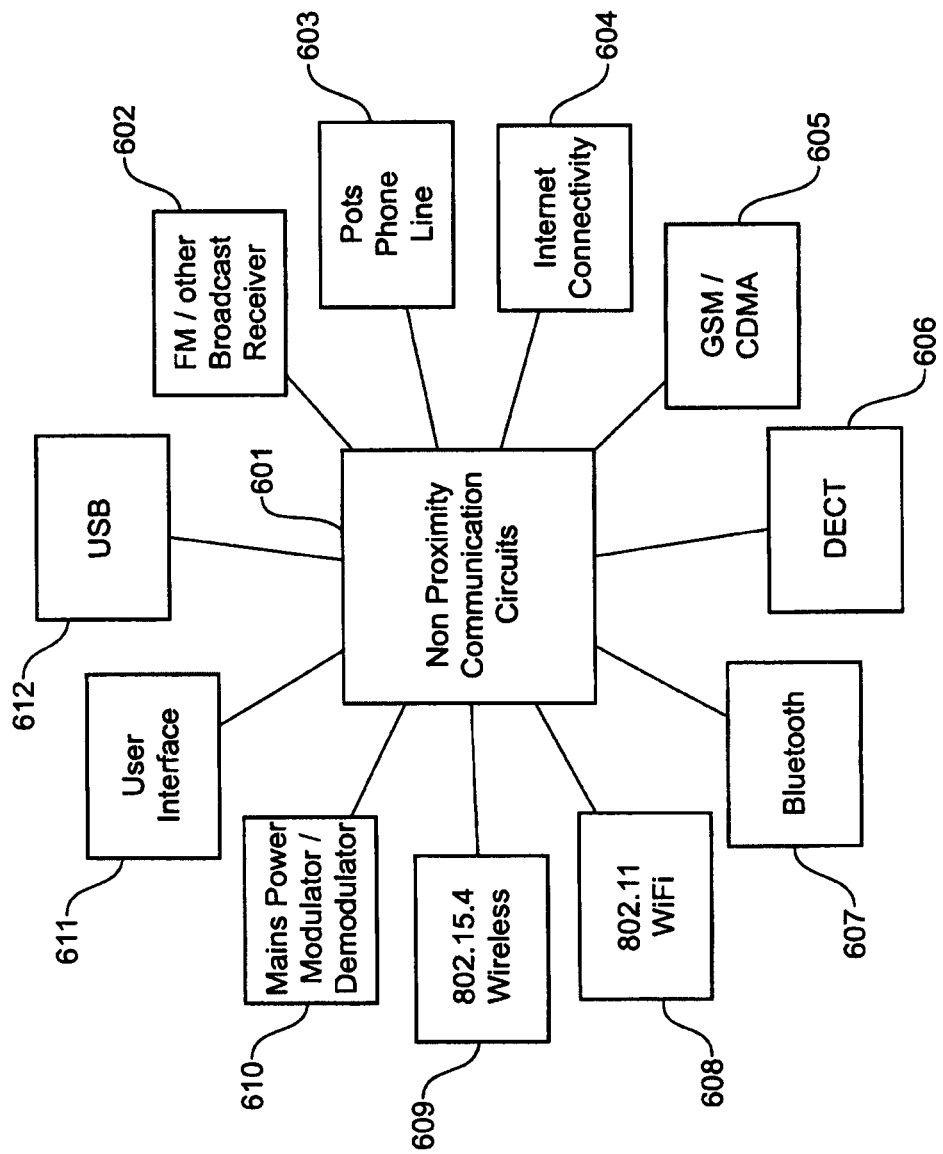
FIG. 7 illustrates various non close proximity communication systems.

FIG. 7 illustrates some examples of the non close proximity communication system 601. These allow users, devices and systems to communicate with the charger device and devices that have formed a wired or wireless connection with the charger's communication systems.

It is also beneficial to be able to communicate to the charger through free to air broadcasts. Such as system can be achieved by having an FM, FM RDS, DVB or other broadcast receiving system 602. This allows communication to devices to within a wider radio broadcast area, extending beyond those arrangements that are equipped with internet or other commonly paid wireless connection such as GSM.

By accommodating a POTs (Plain Old Telephone) system 603, communication with the charger can be achieved using DTMF (Dial Tone Multi Frequency) signaling. This also extends the ability to communicate using the internet. Internet connectivity 604 can be achieved in a number of ways, for example, through wired or wireless routers, GSM/CDMA 605, WiFi 802.11 (as depicted by 608) and other systems.

Having a DECT (Digital Enhanced Cordless Telecommunications) system 606 only allows the charger to charge a handset and also route voice and other data to the handset via the charger itself. The 802.15.4 system 609 is commonly used in home automation systems and provides the benefits of PAN connectivity between the charger and devices on that PAN. 802.11 Wifi 608 and Bluetooth 607 can be beneficial in communicating with the current generation of smartphones, tablets, remote controls and other commonly connected devices.

The data communication systems described herein provide for data gathering of data from devices. Large amounts of data can be gathered from data logging and therefore it can be beneficial to accommodate higher speed data transfer links to recover that data. By incorporating a USB 612, link, data can be downloaded (at an often slow data rate) to the charger during the time the device is within close proximity to the charger, then downloaded to a PC using a high speed USB link.

Incorporating a user interface 611 which might include a display, buttons, speaker and microphone allows a user to directly communicate and interact with devices and services. An example of this might be to implement a device finder feature. Pressing a button could send a signal a controller, activating an audible beeper on the controller helping the user to find the device. Alternatively, a screen on the charger could list multiple devices allowing the user to select a particular device to find. Providing a microphone and speaker also facilitates voice activation capabilities for communication with the charger and devices. Incorporating mains power modulation and/or demodulation circuit 610, can allow the charger to communicate with devices connected on a mains circuit.

Figure 8:
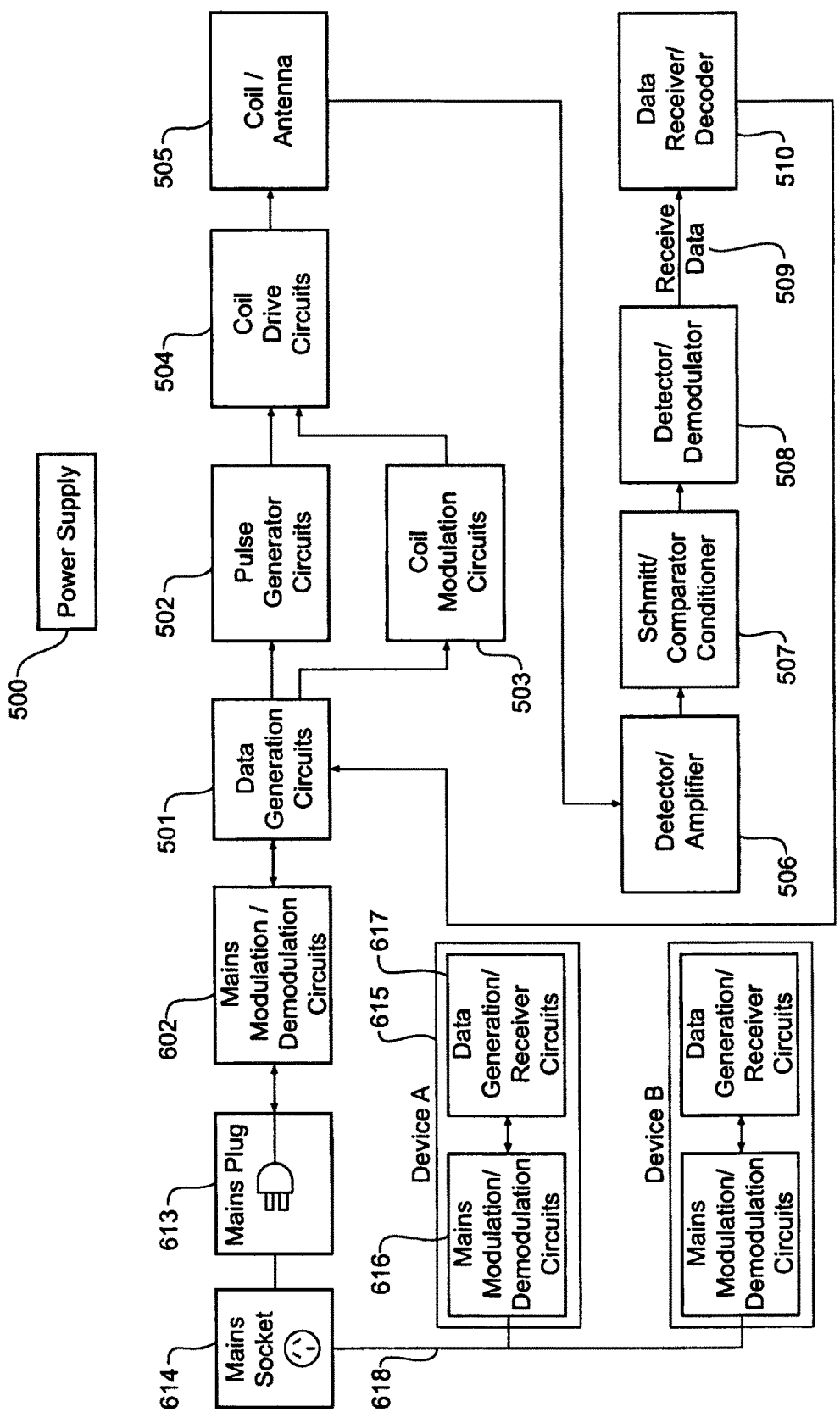
FIG. 8 illustrates a signal modulation over mains power communication arrangement.

FIG. 8 depicts a charger equipped with a long range (non proximity) communication system based on a signal modulation over mains power wiring arrangement to illustrate data transfer from the charger to devices using mains wiring. The data generation circuits 501 in the charger provide data to the mains modulation and optional demodulation circuits 602. This data is modulated as a signal onto the 240V or 110V mains supply and connected to the mains circuit 618 via the mains plug 613 and mains socket 614. Optionally the charger device could be directly wired into the mains circuit. This signal can then be detected and demodulated by device 615 also equipped with mains modulation and demodulation circuits 616 that then provides the data to the devices data generation and receiving circuits 617. This data can then be used to command, control or gather information on any device connected to the mains circuit 618.

The ability to send messages to devices using the communications mechanisms of the charger can be extended to sending advertising messages, coupons and the like to devices or the user interface of the charger. The messages can be displayed when received or can reside in the memory of the device or charger to be presented to a device or user at a later time based on a trigger event, such as time, location, movement of a device, or other inputs or signals. Additionally applications can be sent over the charger communications mechanisms for use by the charger itself or devices in communication with the charger.

To transfer data from the device illustrated in FIG. 4 back to the charger in FIG. 5 while the wireless charger is providing a charging field, the pulse generator circuit 305 is used to load modulate the coil 306 by momentarily providing a low impedance path to ground.

Figure 9:
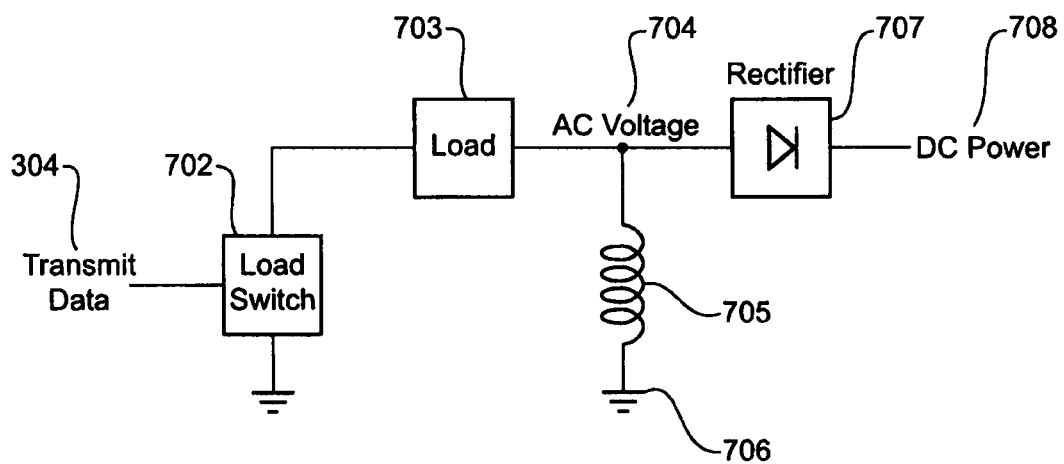
FIG. 9 illustrates load modulation of a coil that is exposed to a charging field.

FIG. 9 shows how a coil is load modulated while in the presence of a wireless charging field. When a coil 705, with one end tied to ground 706, is in the presence of a charging carrier field, an AC voltage 704 appears on the coil. This is normally rectified using the rectifier 707 to produce DC power 708 suitable for charging a battery or directly supplying circuits. The device can communicate with the charger by using transmit data 304 to momentarily switch a load 703 to ground using the load switch 702. The charger illustrated in FIG. 5 then illustrates how the detector/amplifier 506, Schmitt/comparator conditioner 507 and detector/demodulator 508 can produce receiver data 509 that is representative of the transmit data 304 shown in FIG. 4.

Figure 10:
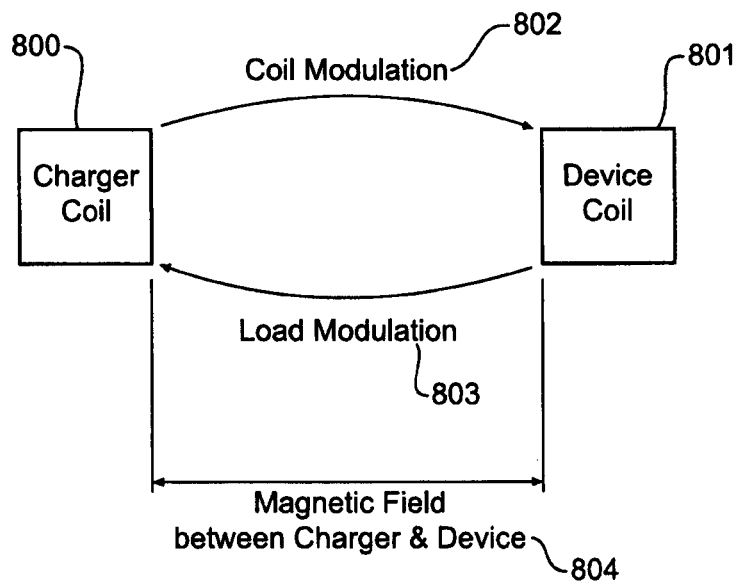
FIG. 10 illustrates how a charger coil and device coil communicate using coil modulation and load modulation.

FIG. 10 illustrates how a charger coil 800 and device coil 801 communicate over short range using the magnetic near field 804. The charger coil is frequency modulated 802 which is received by the device coil 801. The device coil 801 is load modulated 803 and received by charger coil 800. In an embodiment using frequency modulation such as FM or FSK to communicate from the charger to the device, and load modulation such as AM or OOK signal to communicate from the device to the charger, full duplex communication can be achieved. An additional benefit is that the AM from the charge mat can be done asynchronously to the carrier. Also, the load modulated data from the device can be asynchronous to the charger carrier.

When a coil is used to pick up a carrier signal, such as in the case when energy from a charger device is being transferred to a chargeable device equipped with on board wireless battery charging, then the energy of the carrier is much greater than the energy of the Pulse Ping. This makes it difficult for a receiver on the charger to detect the Pulse Pings from the chargeable device.

In this case a Load Ping is used to communicate from the chargeable device to the charger. This is generated by momentarily loading the coil being energized by the carrier of a charging device. This momentary loading of the coil creates a Load Ping that that can be detected using a suitable receiver on the charger during wireless charging.

For the case where the wireless charger needs to communicate to a device being charged, a CM Ping is used. In this case the carrier of the wireless charger is momentarily disturbed, creating an energy fluctuation that can be detected using a suitable receiver in the chargeable device. The carrier may be disturbed by momentarily reducing the amplitude of the carrier, momentarily turning off the carrier, momentarily phase reversing the carrier, or by momentarily changing the frequency of the carrier. This momentary event causes a CM Ping.

A true Ping event is a return to zero event. That is, once the momentary energy event has occurred, it returns to a steady state. This is the case of Pulse Pings as a pulse of energy is introduced to a coil which then returns back to a steady state.

In the case of a Load Ping, the coil is momentarily loaded which takes energy from the field, once again causing a momentary energy change that returns to a steady state. In the case of a coil modulation Ping, CM Ping, if the amplitude of the carrier is momentarily changed, then this also causes a momentary energy change which returns to a steady state once the amplitude pulse is restored. True analog amplitude modulation can be used to transfer data but does not itself represent a return to zero method as the decoded output is typically analog. Similarly, frequency modulation techniques can be used to transfer data but require FM decoders and do not represent a true return to zero system. In the case of ASK or FSK, the data event is represented by an edge that corresponds to the instant the frequency or amplitude changes on the carrier. The frequency or amplitude change remains for the duration of the data bit then changes with a bit state change. Whereas an instantaneous AM pulse represents a subset of CM Ping where the carrier amplitude is only momentarily altered, then restored to the normal steady state amplitude. It is this momentary amplitude change that is detected by a device's receiving circuits then converted to a data pulse. The series of pulses is representative of the data used to create the CM Pings.

Figure 11:
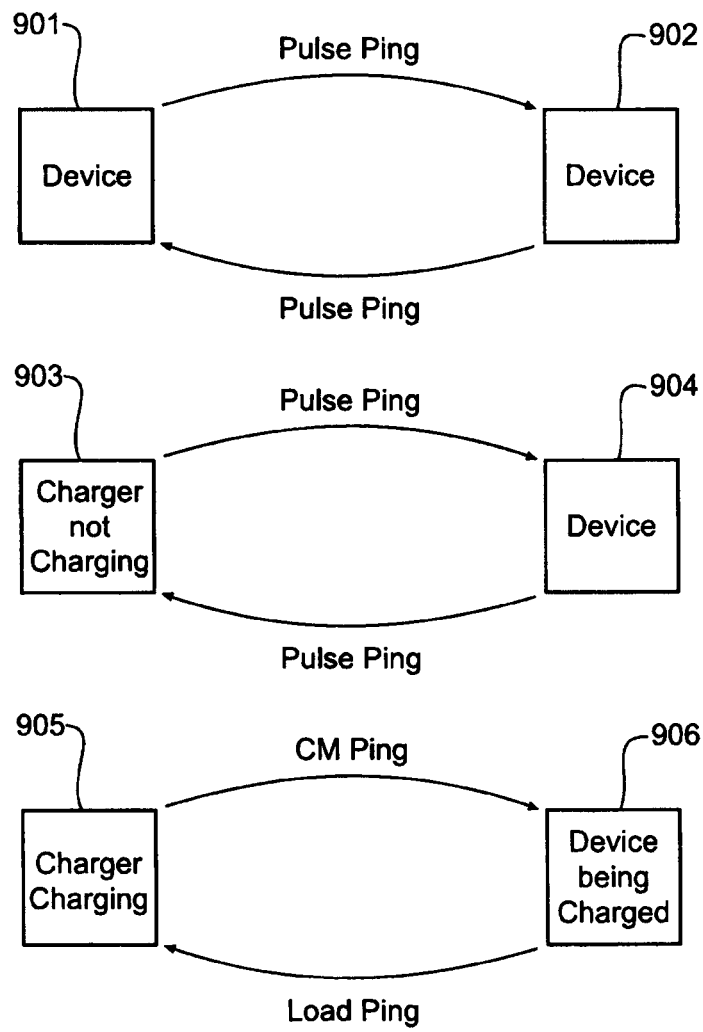
FIG. 11 illustrate how Pulse Pings, CM Pings and Load Pings are used to communicate to various device types.

FIG. 11 shows how the various Ping types are used to communicate between various devices. Device 901 represents a device not being charged, communicating to another device 902 also not being charged. In this case Pulse Pings can be used to communicate over the near field when the devices are within close proximity.

Additionally, device 903 is a charger device in close proximity with a device 904 that is not being charged. In this case there is no charging carrier present and therefore Pulse Pings can also be used to communicate.

In the last case where device 905 represents a charger device in close proximity with a device 906 where the charger 905 is charging the device 906. In this case a charging carrier is present and the charger uses CM Pings to communicate to the device and the device uses Load Pings to communicate back to the charger.

Figure 12A:
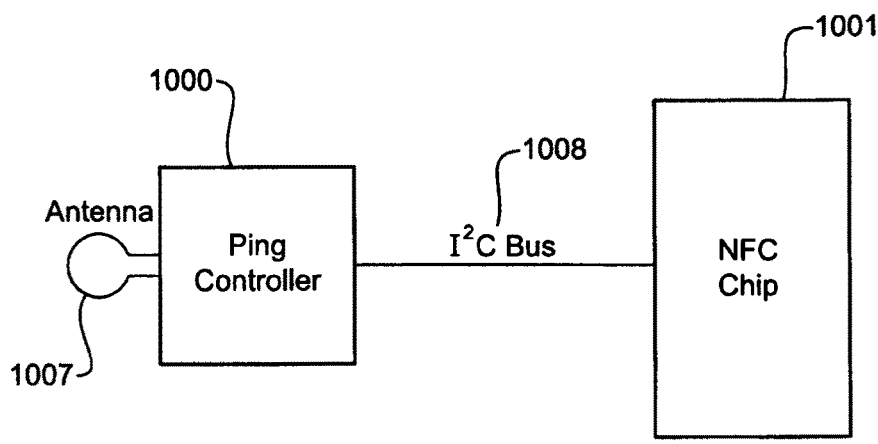
FIGS. 12A, 12B and 12C illustrates how a proximity Ping system can be used to wake up an NFC subsystem.
Figure 12B:
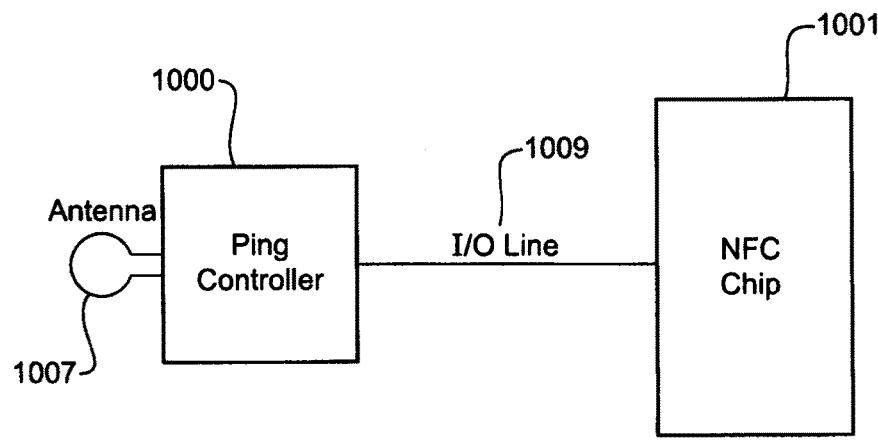
Figure 12C:
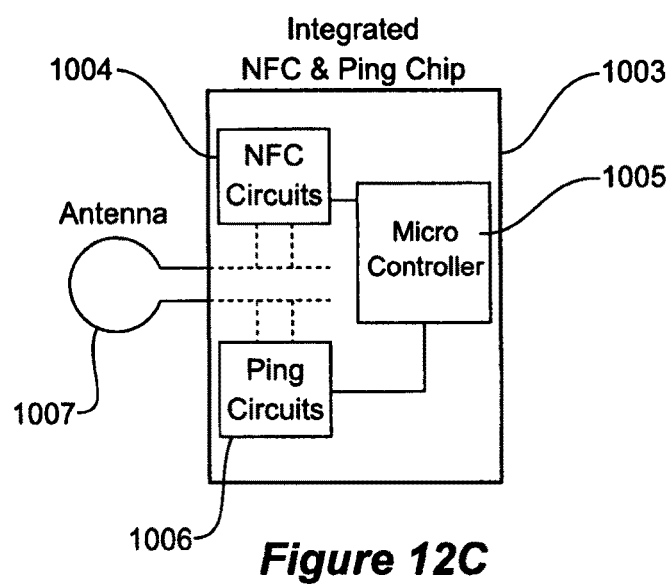

FIGS. 12A, 12B and 12C illustrate how a proximity Ping system can be used to wake up an NFC subsystem within a device compliant to one or more of NFC protocols. The Ping Controller contains all the necessary circuits described within this document to transmit and receive Pings. Using the example of the transfer digital data at 2400 baud over a distance of a few centimeters by the Ping Controller, an approximate average current can be calculated. The average current required to send one byte ten times per second is in the order of 60 microamps, however this can be reduced even further by minimizing the number of bits sent in a Ping and the number of times a Ping is transmitted each second. For this reason the Ping Interface is a very good technology choice for detecting when another device is in close proximity. If two devices have the Ping Interface and one is configured to transmit a known bit sequence at regular intervals (say 10 Hz) and the other is configured to listen for that bit sequence, then if the receiver hears the known bit sequence, it can transmit data in response back to the transmitter. In one embodiment, the response data could describe another higher speed communications interface that the receiver has, such as an NFC interface. In this case the description could contain the following information:

radio link speed e.g. 424 kbit/s
protocol type e.g. ISO/IEC 18092 NFCIP-1
mode e.g. passive or active Once the transmitter device had received this information from the receiver device it could then use it to startup and configure its local NFC chip accordingly, thus enabling it to communicate over NFC to the receiver device at much higher data rates. The advantage here is that whilst the transmitter device is not actively engaged in NFC communications, it could turn off its local NFC chip thus saving power. In general, NFC chips consume in the order of 60 milliamps of average current when the radio is turned on. Thus by employing the Ping Controller to implement Pings, a device that uses NFC such as a smartphone can reduce its average near field current usage by 1000 fold and still be able to detect when another device comes into proximity.

In one embodiment shown in FIG. 12A, the Ping Controller 1000 is equipped with a close proximity antenna element 1007. The controller 1000 can communicate with the NFC chip or NFC system 1001 using a serial I2C bus 1008. This can be used to wake up the NFC chip from a low power sleep mode. In another embodiment shown in FIG. 12B, the Ping Controller 1000 can communicate with the NFC chip 1001 using an input/output line 1009. This can also be used to wake up the NFC chip from a low power sleep mode.

In yet another embodiment shown in FIG. 12C, the Ping transmitting and receiving circuits have been combined into an integrated NFC and Ping chip 1003. The chip contains the NFC circuits 1004, the Ping circuits 1006 and a micro controller 1005. It may be possible to use the same near field antenna 1007 for both the Ping and NFC circuits.

These solutions combine the advantages of low power Ping detection with the advantages of high data rate NFC. Since the average running power of the Ping circuits is very low, even when run continuously, they are suitable for battery powered devices and can eliminate the need for a user to manually turn on the NFC system using an application, selecting a menu item or the like.

The Ping data can be encoded in any number of formats. One example might be to use a pulse position encoding system, where the position of the Ping within a time slot represents a logic 0 or logic 1 in the data stream.

Figure 13:
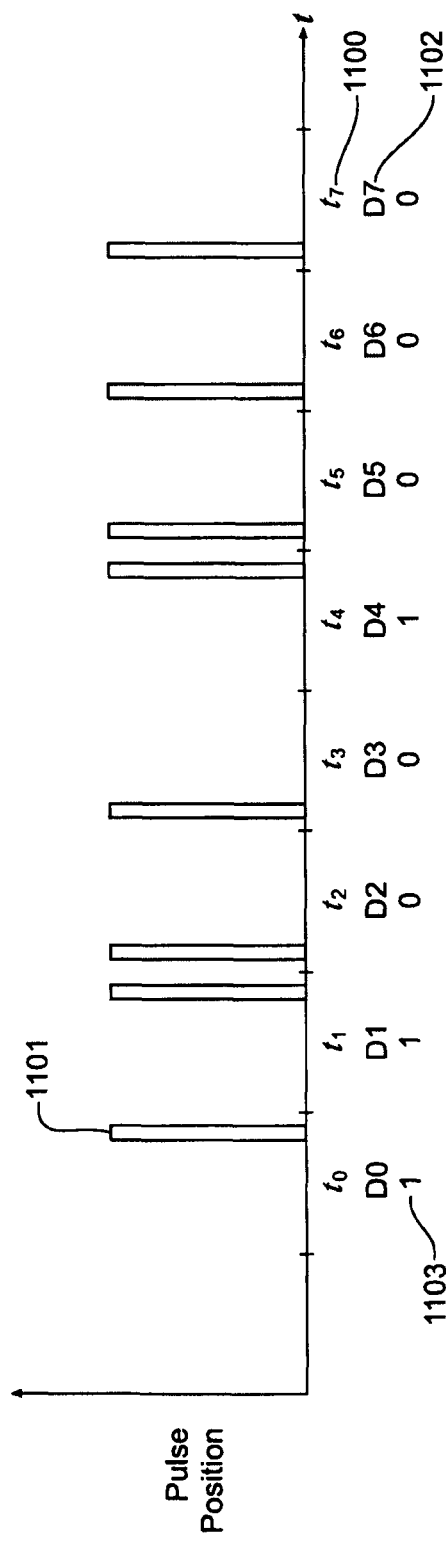
FIG. 13 illustrates an example of Ping data using pulse position style encoding.

FIG. 13 illustrates how this may be implemented. Bit time slots 1100 represented by t0-t7 define the bit position, the bit data 1103 being transmitted by the Pulse Pings 1101. In time slot t0, the Pulse Ping occurs at the end of the time slot and therefore represents a logic 1 data bit. In time slot t2, the Pulse Ping occurs at the beginning of the slot and therefore represents a logic 0 data bit.

The data receiver needs to time the position of these Pulse Pings within each time slot to decode the data bits 1102 represented by D0-D7 to produce the data 1103, in this case the byte 11001000 is the result. In this example, a Pulse Ping occurs for every bit transmitted. Another system might mimic a serial UART style transmission method, where a start bit is followed by 8 data bits.

Figure 14:
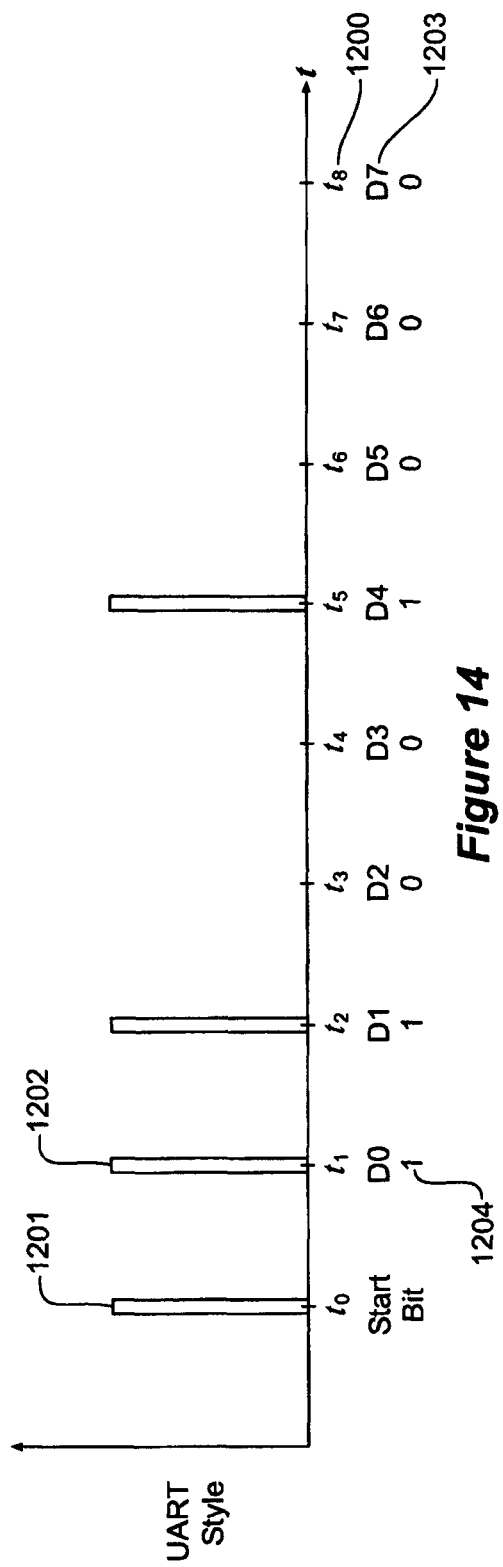
FIG. 14 illustrates an example of Ping data using UART style encoding.

FIG. 14 illustrates how this may be implemented. Time slots 1200 are used to poll the data level. In this case the level is high when a Pulse Ping 1202 is present as seen at time position t1 and low when a Pulse Ping is absent as seen at time position t3. In this system a start bit 1201 is used to begin the transmission of the data byte 1203 at time t0. The level is then checked at each of the timed bit positions 1200 from t1-t8, representing data bits 1203, D0-D7. In time slot t1 the Pulse Ping is received and therefore represents a logic 1 data bit. In time slot t3, the Pulse Ping is absent and therefore represents a logic 0 data bit. The data receiver needs to detect the presence or absence of each of the data bits 1203 to produce the data 1204, in this case the byte: 11001000.

In this example a Ping event is generated only when a logic 1 is required. So a Ping would represent a start bit, then the following bits are timed from this. So if one bit time later there was another Ping, then that would represent a logic 1. The advantage of this system is that if a data bit is equal to a logic 0, then no Ping event is needed, thus further reducing the need for transmission power. Thus an encoding system of minimum 1's could be developed to ensure minimum power requirements for data transfer. In the extreme case, the data byte 00000000 requires just one Ping representing the start bit. No further Pings or transmission energy is needed for the rest of the byte.

The above described communications system can be beneficially applied to a wireless charging system. An example of a charging protocol is described below.

Feature Summary:

Power saving mode when no devices are charging;

One charger device or charger coil can charge multiple end devices simultaneously;

Simple end devices that do not have a microprocessor (such as a torch) can be charged;

A charger device can notify a third device (such as a smartphone) that a simple device is fully charged;

Regular end devices can request the amount of power they require to charge safely in the optimum amount of time;

A charger device may communicate with non-chargeable end devices and relay any data read on to a third device.

Bidirectional Communication:

End devices can send information to a charger;

A charger device can send information to one or more end devices;

Information is sent in data frames;

The data frame structure is: header, optional payload and checksum.

Operational Modes:

Idle Mode;

Soft Charging Mode;

Full Charging Mode.

Figure 15:
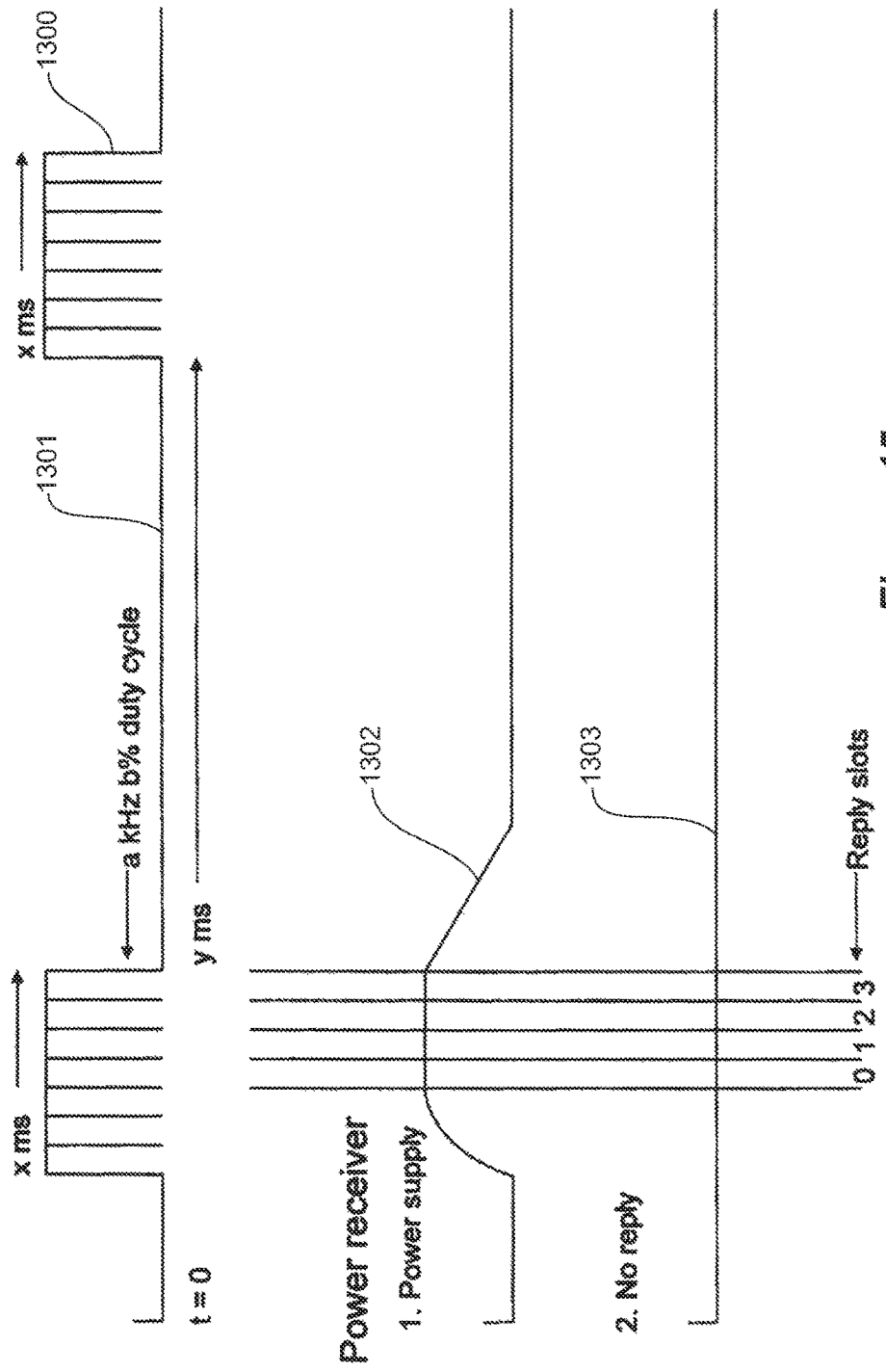
FIG. 15 illustrates the communication methods for a charger in idle mode.

Idle Mode is described with reference to FIG. 15. In Idle Mode, the charging device is waiting for an end device to come in to close proximity and request the charging service. In this mode the charging device emits a short burst of carrier 1300 of x milliseconds duration (idle burst) and then turns off the carrier 1301 for y milliseconds to minimize power consumption. The duty cycle of the carrier can also be reduced from 50% to further reduce power. A typical embodiment would be:

x=50 ms y=950 ms carrier=132 kHz with 25% duty cycle

During the carrier burst time, the charger device is listening for valid data (a confirmation signal) to be detected on the charger's close proximity receiving circuits. If no valid data is detected, as shown in 1303 no reply, the carrier burst pattern 1300 turns off, then the burst cycle is started again y ms later. This pattern repeats until an end device responds with a valid data (a confirmation signal), referred to here as the Aloha sequence as an example, during a carrier idle burst. If the charging device detects the Aloha sequence it transitions to Soft Charging Mode.

The end device can generate the Aloha response when it is placed within proximity of the charger device as the charger's charging field generates a rising power supply in the device 1302 until the logic circuits or microprocessor can operate in order to transmit the Aloha data. If the charging device detects the Aloha sequence it transitions to Soft Charging Mode. The Aloha sequence is a sequence of 8-bits with a known value for example hexadecimal 55 (01010101) sent using Load Ping signaling.

Figure 16:
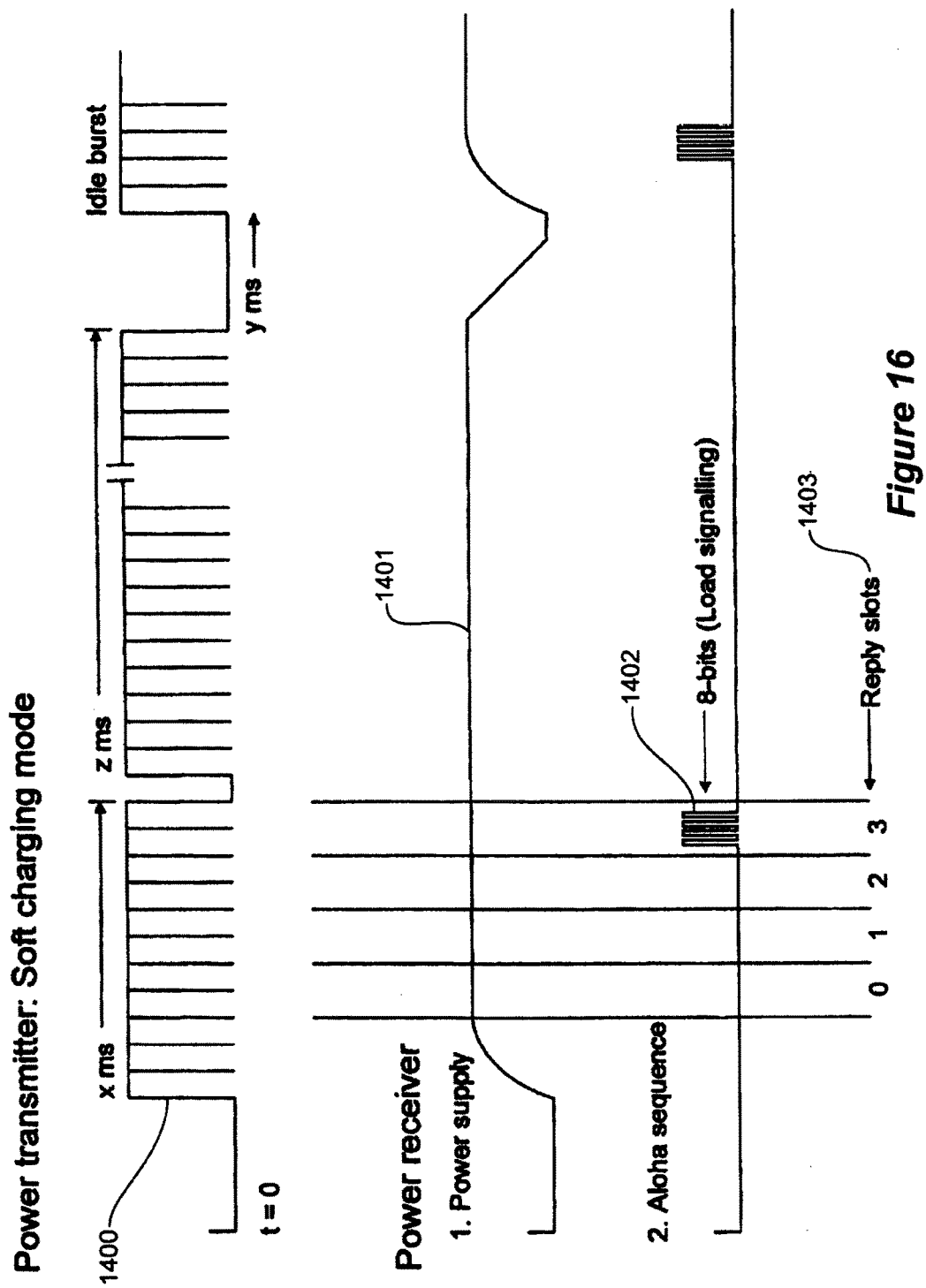
FIGS. 16 and 17 illustrate the communication methods for a charger in soft charging mode.

Soft Charging Mode is described with reference to FIG. 16. In Soft Charging Mode the charging device transfers power by turning on the carrier 1400 for z milliseconds then pauses (i.e. turns the carrier off) for y milliseconds and emits a carrier idle burst for x milliseconds. A typical embodiment would be:

x=50 ms y=50 ms z=9900 ms carrier=132 kHz with 25% duty cycle

This pattern repeats as long as the end device responds with a valid Aloha sequence during the carrier idle burst. If the charging device does not detect the Aloha sequence it transitions back to Idle Mode.

When the end device is placed within proximity of the charger device, the power supply for the end device, 1401 rises and allows the on-board data generation circuits to transmit the valid Aloha sequence 1402 by, for example, load modulating the charging field of the charger device.

Figure 17:
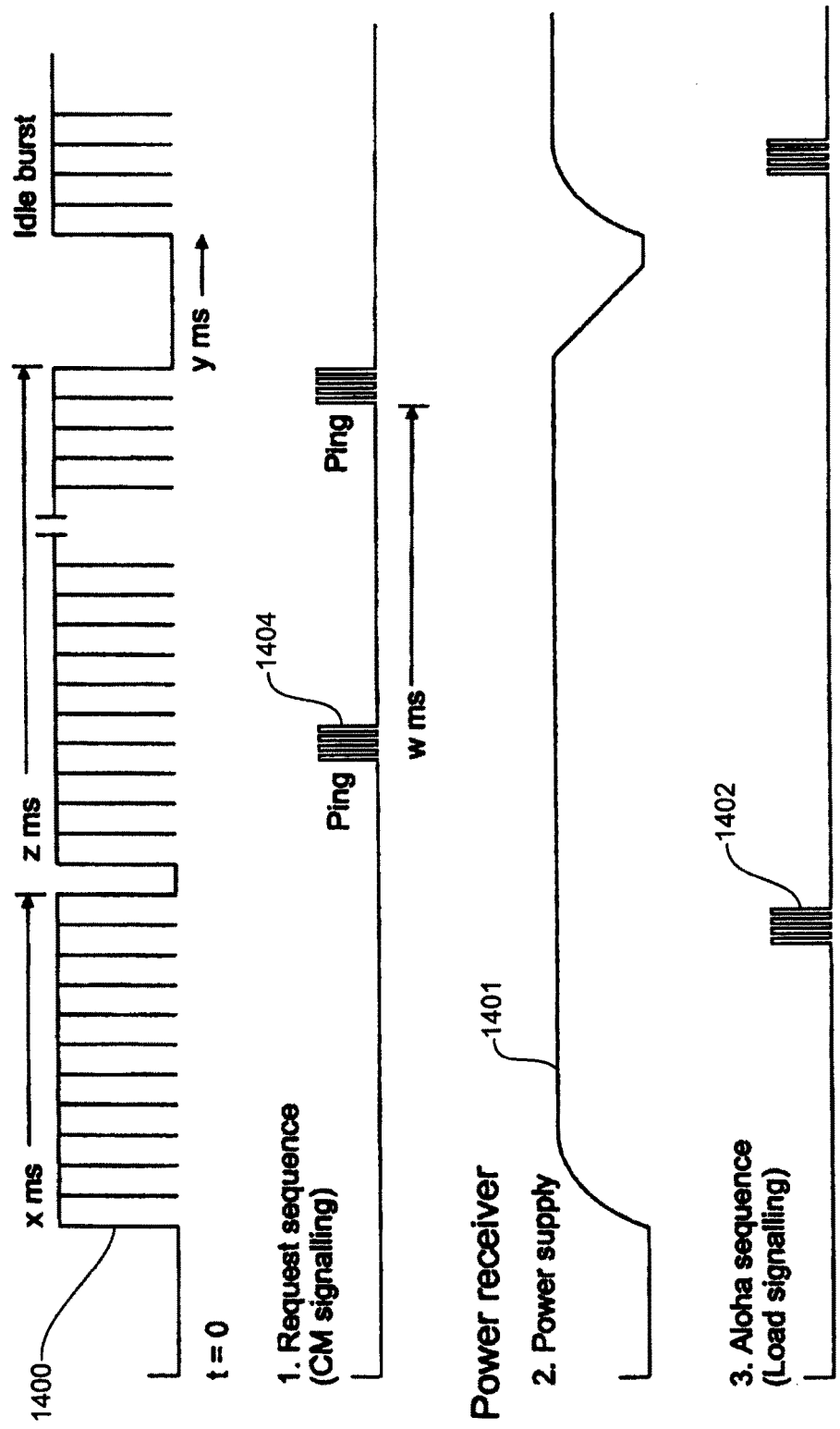

During the Soft Charging Mode the charging device transmits Ping data frames at regular intervals using CM Ping signaling. These Ping data frames 1404 are depicted in FIG. 17. A Ping data frame is a request for device response. If an end device detects a Ping it will reply with a Ping* data frame using Load Ping signaling. If the charging device receives a Ping* data frame it will add the device to its Polling List and transition to Full Charging Mode. A Polling List is a list of end device identifiers held in the memory of the charger device. The Polling List is used by the charger device to manage and communicate with the end devices.

Figure 18:
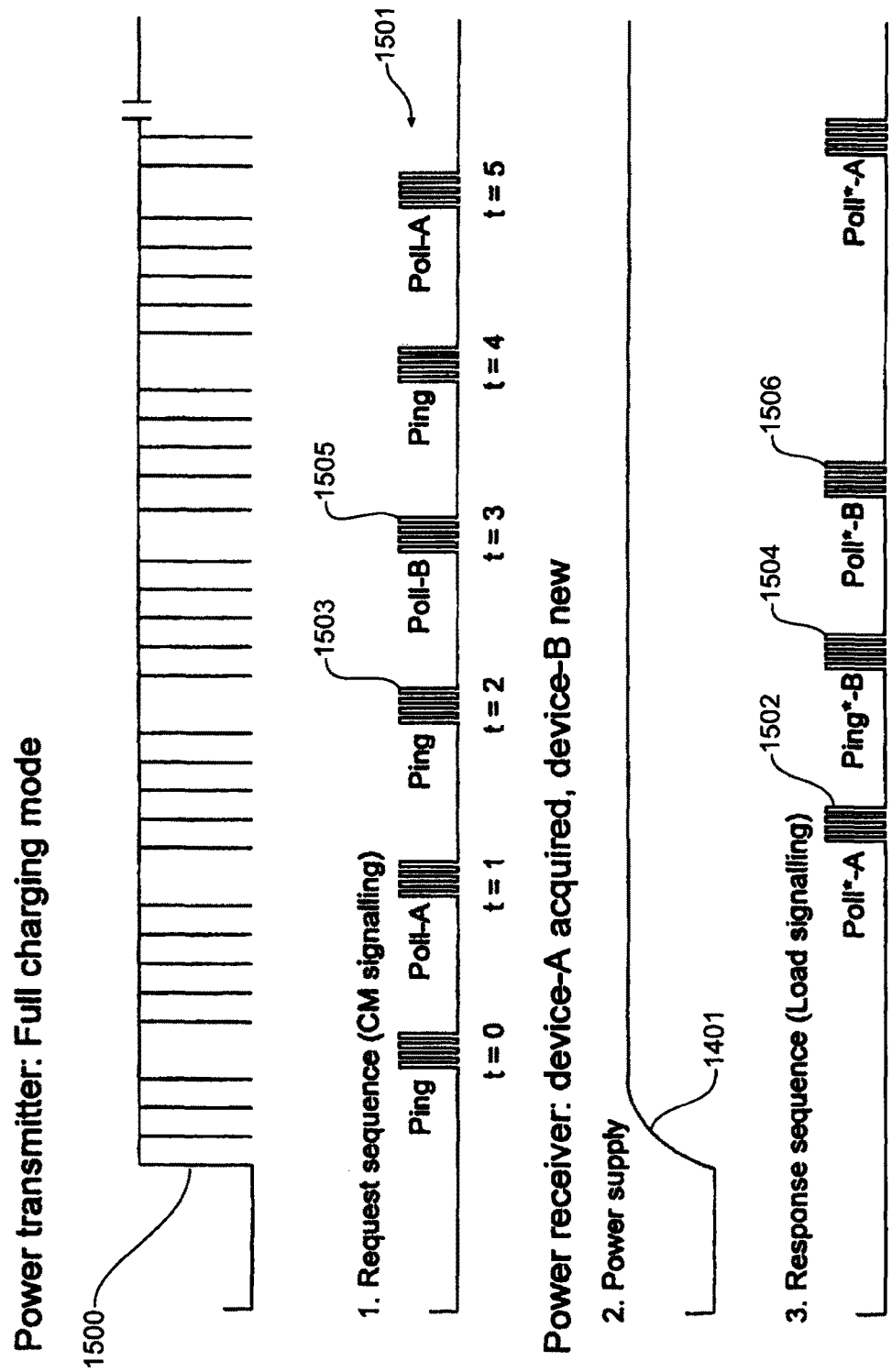
FIG. 18 illustrates the communication methods for a charger in full charging mode.

Full Charging Mode is described with reference to FIG. 18. In full charging mode the charging device transfers uninterrupted power to the end device using carrier 1500 and maintains regular communications with each device in the Polling List and actively scans for new end devices that might have been placed on it by transmitting Ping data frames.

The charging device alternates between sending Ping and Poll data frames as shown in 1501. Poll-A refers to a Poll addressed to device A in the Polling List, Poll-B refers to a Poll addressed to device B, etc. Each successive Poll data frame is addressed to the next device in the Poll List. The only exception is when a new device is detected, in which case the new device is polled immediately by the next Poll. A typical embodiment might have the Ping/Poll frames spaced at regular 500 millisecond intervals.

An end device is expected to respond to the charging device's Poll data frame addressed to it with either a Poll* data frame or a Command data frame. In this example Poll*-A 1502 of FIG. 18, refers to the poll response of device A. The response for the Poll* data frame or Command data frame must be sent within a certain amount of time. In one embodiment, the poll response was crated by load modulating the charging field at a regular time interval. If the charging device does not receive any response from an end device for a number of successive poll cycles, the end device is removed from the Polling List. A Poll* data frame is sent by an end device if it has no command and therefore no Command data frame to send to the charging device.

As in Soft Charging Mode, when a charger device is in Full Charging Mode (shown in FIG. 18), a new end device is added to the Polling List when it responds to the charging device's Ping 1503 with a Ping*-B 1504, for example. In this case, Ping*-B 1504 has a device identifier of device B. Device B is subsequently maintained on the Polling List when it responds to the chargers Poll-B 1505 in the time slot t=3 with a Poll*-B 1506.

Figure 19:
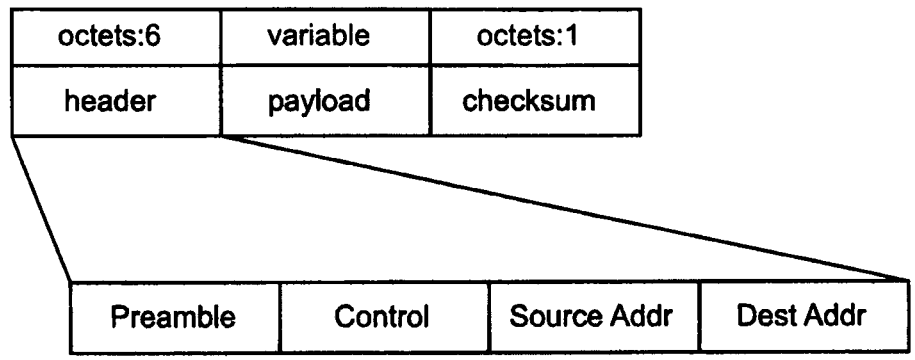
FIG. 19 illustrates an example of a Protocol frame format.

Referring to FIG. 19 which illustrates an example of a Protocol frame format, where the Source Addr is the address of the sender device, whether that be the charger device or end device, the Dest Addr is the address of the destination device identifier that the frame is targeted to.

A broadcast destination address is used in the case of a Ping data frame as it is a general broadcast that is looking for yet to be identified end devices.

Since Ping data frames use the broadcast destination address it is possible that two new end devices may try and respond at the same time causing a communication collision. To minimise the possibility of communication collisions, the period in which a valid reply may be sent to the charging device is divided into a number of reply time slots. Each end device randomly chooses a reply slot and sends its reply. The devices that reply are then polled.

It is possible that the Ping* sent by an end device in response to the charging device's Ping may not be received. In this case the end device will not be included in the Polling List and as a consequence, the charging device will not poll it. Also in another case, if the charging device forgets the Polling List (possibly due to power failure or data corruption) the end devices will not get polled. If an end device that is expecting to be polled does not receive a Poll from the charging device as expected, it will once again respond to Ping data frames.

When the Polling List becomes empty, the charging device transitions back to Idle Mode. Alternatively, a method of Ping data collision avoidance can be implemented where devices listen for Ping traffic and do not start transmitting if other devices have already started transmitting Ping data.

Figure 20:
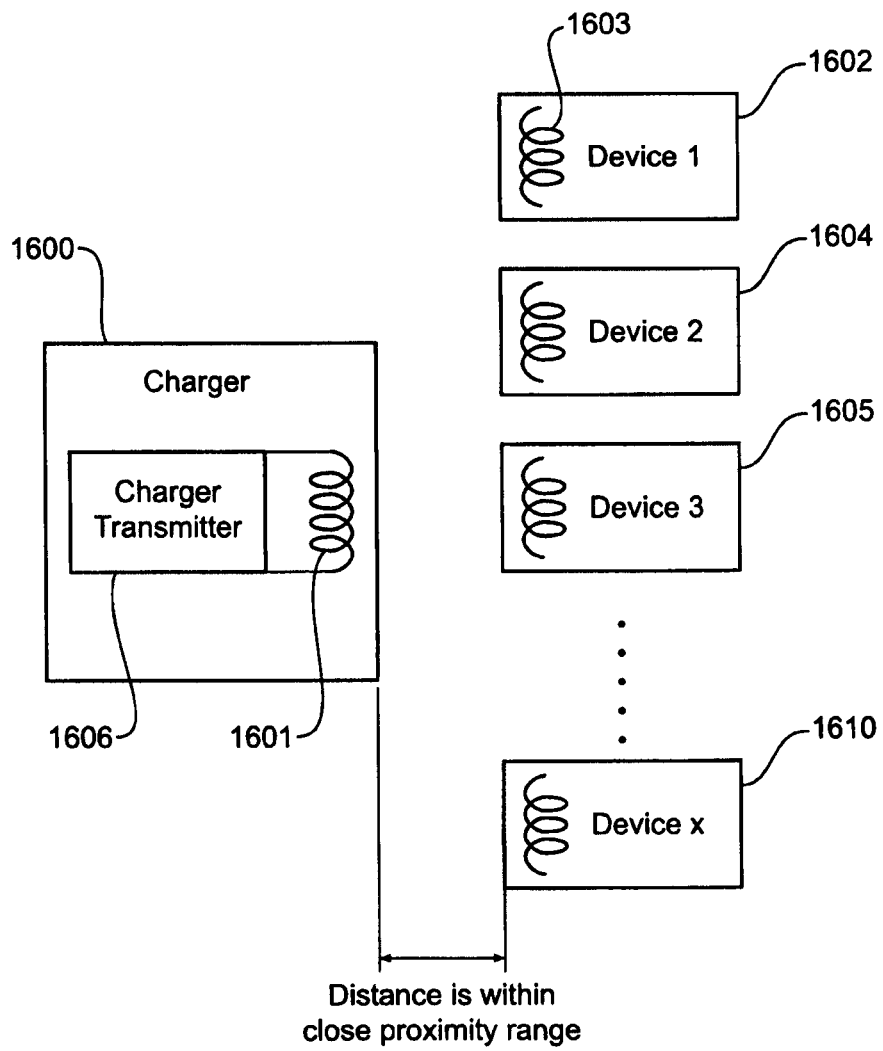
FIG. 20 illustrates an arrangement where multiple devices can be charged using a single charging coil and carrier transmitter.

FIG. 20 illustrates an arrangement where multiple devices can be charged using a single charging coil and carrier transmitter. Charger device 1600 is shown to contain a charging coil 1601 which is energized with a carrier transmitter 1606 for the purpose of charging devices placed within close proximity of the coil 1601. A device 1602 equipped with a coil 1603 is placed within close proximity range of the charger 1600 such that the device coil 1603 is energized by the carrier transmitted by the charger coil 1601. Similarly additional devices 1604, 1605 and 1610 can be placed within close proximity to be charged.

The data protocols and methods described herein allows multiple devices to be charged from a single coil driven by a single carrier transmitter.

In one embodiment, a PCB etched track coil is used as the single carrier transmitter. In another embodiment, the single carrier transmitter is a single coil. As the communication described herein is a low power application, it was discovered that a wound wire coil is not required. For example, transmitting 2.5 W of power is easily accomplished using this arrangement. For larger power transfer, wound coils become an advantage due to lower resistance and higher Q but that is not the case with near field communication using low power.

Figure 21:
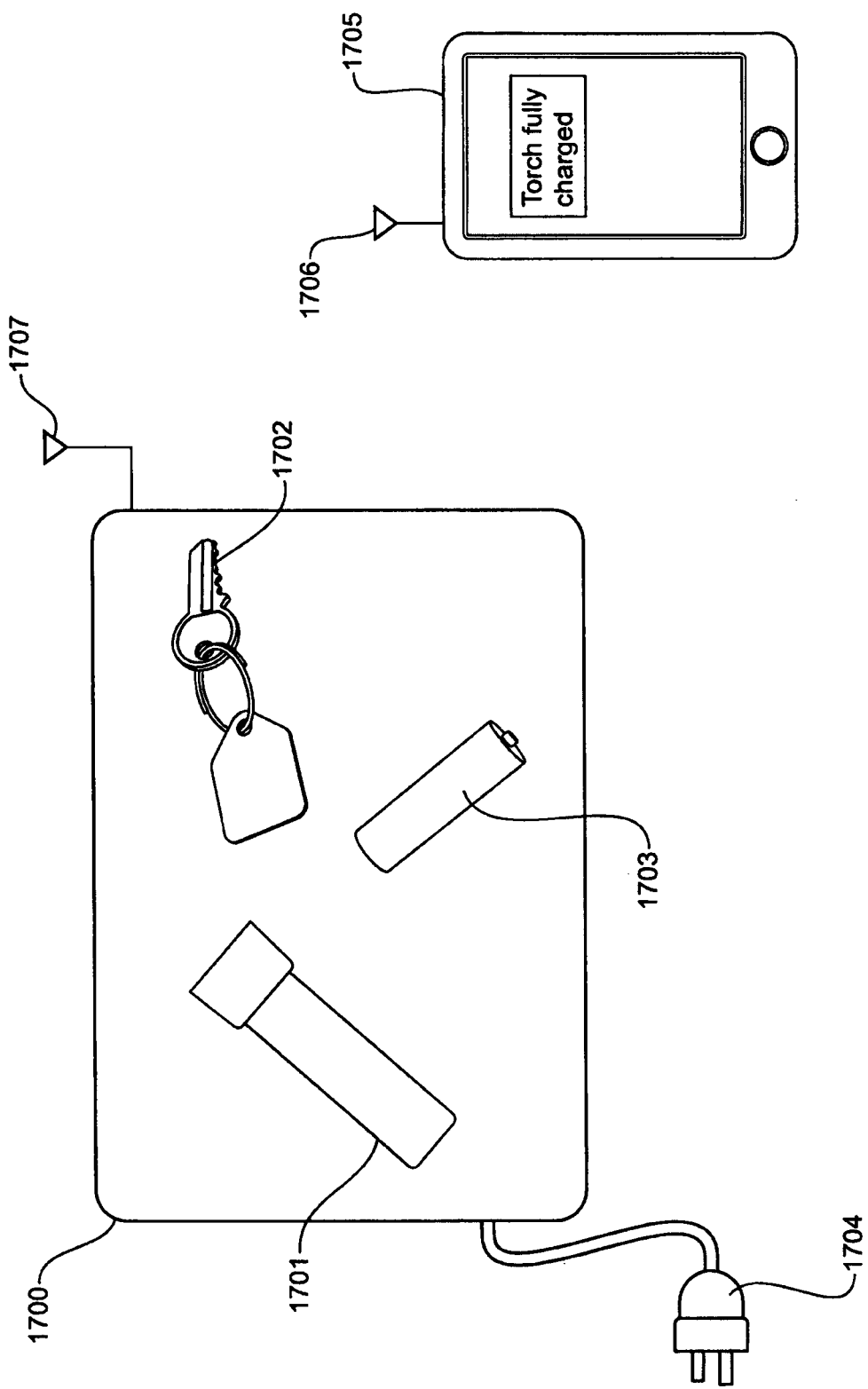
FIG. 21 illustrates how several physical devices can be placed on a charger for the purpose of being charged and a controller being communicated the charging status of a torch.

FIG. 21 illustrates how several physical devices can be placed on a charger for the purpose of being charged concurrently. The charger 1700 is plugged into a power supply using plug 1704 and devices 1701 torch, 1702 keyfob and 1703 battery are placed on the charger for charging. Each can charge simultaneously. Optionally, the charger can be equipped with a long range wireless communication mechanism which can communicate using antenna 1707. Additionally a mobile device such as a smartphone or remote control 1705 can also be equipped with a long range communication mechanism which can communicate using antenna 1706. In this way, the torch 1701 has sent a message using the long range communications mechanism to the mobile device indicating that the torch is fully charged.

The network parameters of the long range communications mechanism can be used to establish a secure link between the charger 1700 and mobile device 1705 using the near field proximity communications mechanism by swiping or tapping the mobile to the charge mat.

A number of wireless charging systems are being considered by the Wireless Charging Consortium. In these cases, the device being charged communicates to the charger using a form of load modulation, not unlike the Load Ping described herein. However the arrangements described by this invention, extend this method to include two way communications between the charger and device, where the charger can now initiate and communicate to the device. The advantages of this is that the charger can offer a wider variety of services such as acting as a data intermediary between the devices in close proximity and other devices such as controllers, etc. The charger can initiate the interrogation of a device rather than the simple case of a device communicating its requirements to the charger.

Multiple devices can be charged simultaneously using a single coil element and a single carrier transmitter as the charger can fully communicate with each device, maintaining charge lists using device identifiers of the devices present and their charge status.

A charger can be equipped with additional communication mechanisms, including NFC or long range wireless systems, allowing it to act as a wireless data repeater or relay between devices either within or not within close proximity range of the charger coil.

The Wireless Charging Consortium defines a Digital Ping as "The application of a Power Signal in order to detect and identify a Power Receiver". Their specification details that the charger energises the charging field and compares any field disturbances such as charger coil voltage, coil current or coil resonant frequency shift compared to the absolute undisturbed state. If there is a disturbance, then the charger assumes that a device has been placed on the charger. The charger then listens for data from the chargeable device for identification and commands.

In the systems described in this invention, the charger carrier burst is used to provide power to the chargeable device if required for charging, but importantly forms the carrier field which is then load modulated by the chargeable device which is then detected directly by the charger's Load Ping receiver circuits. Furthermore, the charger can communicate and exchange data with the chargeable device.

Thus the system does not rely on absolute steady state system values as a basis for comparison to detect the presence of a device. Rather it communicates directly with the chargeable device during and subsequently after the idle burst. Furthermore, this communication can be bidirectional and in some embodiments be full duplex communications.

The invention is different from RFID systems too. Many RFID systems exist but all fundamentally consist of a reader and a tag. The reader is normally a high powered device that is permanently connected to a large capacity source such as a mains supply or large capacity batteries. This high power consumption makes readers unsuitable to be included in portable devices such as mobile phones, media players or small sensors.

Depending on the type of system, the carrier can be used to both power the tag and carry the data, or in the case of a self-powered tag, is used for data transfer only. Further variants include systems where the reader talks first or the tag talks first. However the common attribute is that they are all based on a carrier system and invariably the reader's power requirements exceed the ability for them to be used in low-power mobile applications.

The invention is different from RF detectors too. An RF detector is a low-power device that is used to detect an RF carrier signal. The output of the detector can then be used to wake up additional circuits that are normally in a sleep mode to ensure a low power consumption for a device. Using a detector, a device can have a very low power consumption while in sleep mode. This system does not have the benefits of the invention described here as they are integrator based and require a carrier to be present for several cycles before the output can switch. As a result they are very slow in reacting making them unsuitable for even low rate data communications.

Thus the above description of embodiments provides details of how one or more of the following characteristics are achieved:

- Exchanges data between two devices wirelessly over a short range such as several centimeters.
- Eliminates the need for a master/slave arrangement.
- Allows a data transfer to be facilitated through a user initiated sweep or touch gesture between the devices.
- Initiates communications between devices using only a touch or sweep gesture.
- Accommodates a large data stream exchange between devices following the prior arrangements.
- Accommodates a long range wireless link between devices following the prior arrangements.
- Achieves a low average current to allow implementation for a mobile or other battery-powered device.
- Communication methods that are compatible and interoperable with wireless charging methods using carrier systems to transfer power.

It will be appreciated by those skilled in the art that the invention is not restricted in its use to the particular application described. Neither is the present invention restricted in its preferred embodiment with regard to the particular elements and/or features described or depicted herein. It will be appreciated that various modifications can be made without departing from the principles of the invention. Therefore, the invention should be understood to include all such modifications within its scope.

The invention claimed is:

1. A method for effecting a near field communication, including the steps of:
    providing a first device including a transmitting element for sending a first effectively carrierless signal and an accelerometer for detecting a movement of the first device for selectively preventing the first device from sending the first carrierless signal when the movement of the first device is less than a predetermined threshold;
    positioning first device at a close proximity to the second device, wherein the close proximity is suitable for a near field communication;
    sending the first effectively carrierless signal from the first device to the second device; and
    establishing a wireless link between the first device and the second device, based on the first effectively carrierless signal.

2. The method of claim 1, wherein the first effectively carrierless signal includes a pulse.

3. The method of claim 1, wherein the first effectively carrierless signal includes a series of pulses.

4. The method of claim 1, wherein the first effectively carrierless signal includes a temporal oscillating signal.

5. The method of claim 1, wherein the step of sending the first effectively carrierless signal causes the step of:
    sending a second effectively carrierless signal from the second device to the first device.

6. The method of claim 5, wherein the step of sending the second effectively carrierless signal causes the step of:
    establishing a wireless link for data transfer between any two of the first device, the second device, and a third device.

7. The method of claim 1, wherein the second device is a device compliant with a first NFC protocol, and the sending of the first effectively carrierless signal allows the second device to communicate with the first device using the first NFC protocol.

8. A method for effecting a near field communication, including the steps of:
    providing an accelerometer in a first device;
    positioning the first device at a close proximity to a second device, wherein the close proximity is suitable for the near field communication;
    sending a first carrierless signal from the first device to the second device; and
    establishing a wireless link between the first device and the second device, based on the first carrierless signal;
    detecting a movement of the first device by the accelerometer; and
    preventing the first device from sending the first carrierless signal when the movement of the first device is less than a predetermined threshold.

9. A device, including:
    a transmitting element for sending a first effectively carrierless signal to a second device when the device is positioned at a close proximity to the second device, wherein the close proximity is suitable for a near field communication; and
    an accelerometer for detecting a movement of the device for preventing the device from sending the first carrierless signal when the movement of the device is less than a predetermined threshold.

10. The device of claim 9, further including:
    a first receiving element for receiving a second effectively carrierless signal from the second device.

11. The device of claim 10, wherein the first effectively carrierless signal and the second effectively carrierless signal establish a wireless link for data transfer between any two of the first device, the second device, and a third device.

12. The device of claim 9, wherein the second device is a device compliant with a first NFC protocol, and the sending of the first effectively carrierless signal allows the second device to communicate with the first device using the first NFC protocol.

13. A device, including:
    a transmitting element for sending a first effectively carrierless signal to a second device when the device is positioned at a close proximity to the second device, wherein the close proximity is suitable for a near field communication;

a first receiving element for receiving a second effectively carrierless signal from the second device;

a rechargeable power storage medium for supplying power to the device;

a second receiving element for receiving a charging field from the second device; and a circuit for using the charging field to charge the rechargeable power storage medium.

14. The device of claim 13, wherein, in the presence of the charging field, the device load modulates the charging field at a regular predetermined interval.

15. The device of claim 9, further including:

a communication mechanism having a first communicating element compliant to a first NFC protocol; wherein the transmitting element and the first communicating element are the same element.

16. The device of claim 14, wherein the first receiving element and the second receiving element are the same element.

* * * * *

UNITED STATES PATENT AND TRADEMARK OFFICE
CERTIFICATE OF CORRECTION

PATENT NO. : 9,602,163 B2  Page 1 of 1
APPLICATION NO. : 13/883323
DATED : March 21, 2017
INVENTOR(S) : Schultz et al.

It is certified that error appears in the above-identified patent and that said Letters Patent is hereby corrected as shown below:

In the Claims

Column 23, Line 17, Claim 16 change "The device of claim 14" to --The device of claim 13--

Signed and Sealed this
Second Day of May, 2017

Michelle K. Lee
*Director of the United States Patent and Trademark Office*